(12) United States Patent
Booth et al.

(10) Patent No.: US 11,034,254 B2
(45) Date of Patent: Jun. 15, 2021

(54) UNDERBODY CHARGING OF VEHICLE BATTERIES

(71) Applicant: Zoox, Inc., Menlo Park, CA (US)

(72) Inventors: Bryan Emrys Booth, San Francisco, CA (US); Moritz Boecker, Millbrae, CA (US); Kyle Matthew Foley, Half Moon Bay, CA (US); Robert Alan Ng, Mountain View, CA (US); Da Liu, Milpitas, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 42 days.

(21) Appl. No.: 15/837,820

(22) Filed: Dec. 11, 2017

(65) Prior Publication Data

US 2019/0176637 A1 Jun. 13, 2019

(51) Int. Cl.
*G05D 1/00* (2006.01)
*G05D 3/00* (2006.01)
(Continued)

(52) U.S. Cl.
CPC ............... *B60L 53/35* (2019.02); *B60L 53/12* (2019.02); *B60L 53/14* (2019.02); *B60L 53/16* (2019.02); *B60L 53/31* (2019.02); *B60L 53/36* (2019.02); *B60L 53/37* (2019.02); *B60L 53/39* (2019.02); *B60L 53/60* (2019.02); *B60L 53/62* (2019.02);
(Continued)

(58) Field of Classification Search
None
See application file for complete search history.

(56) References Cited

U.S. PATENT DOCUMENTS 8,138,718 B2 * 3/2012 Dower ................. H02J 7/0045
320/109
9,527,403 B2 12/2016 Mardall et al.
(Continued)

FOREIGN PATENT DOCUMENTS

EP 3070810 A1 9/2016
WO WO2010003021 A2 1/2010

OTHER PUBLICATIONS

PCT Search Report and Written Opinion dated Mar. 14, 2019, for PCT Application No. PCT/US2018/064752, 14 pages.
(Continued)

*Primary Examiner* — Harry Y Oh
(74) *Attorney, Agent, or Firm* — Lee & Hayes, P.C.

(57) ABSTRACT

A system for charging one or more batteries of a vehicle may include a charging box mounted to a vehicle to facilitate connection to a charge coupler from under the vehicle. The charge coupler may be configured to provide an electrical connection between an electrical power source and the charging box. A vehicle including the charging box may maneuver to a position above the charge coupler, after which electrical contacts of the charging box and the charge coupler may be brought into contact with one another. The charge coupler and/or the charging box may be configured to provide electrical communication between the electrical power source and the one or more batteries, so that the electrical power source may charge one or more of the batteries. Thereafter, the electrical contacts may be separated from one another, and the vehicle may maneuver away from the charge coupler.

20 Claims, 7 Drawing Sheets

US 11,034,254 B2
Page 2

(51) Int. Cl.
| | | |
|---|---|---|
| *G06F 7/00* | (2006.01) | |
| *G06F 17/00* | (2019.01) | |
| *B60L 53/35* | (2019.01) | |
| *B60L 53/14* | (2019.01) | |
| *B60L 53/12* | (2019.01) | |
| *B60L 53/36* | (2019.01) | |
| *B60L 53/60* | (2019.01) | |
| *B60L 53/62* | (2019.01) | |
| *B60L 58/12* | (2019.01) | |
| *B60L 58/22* | (2019.01) | |
| *H02J 7/00* | (2006.01) | |
| *B60L 53/37* | (2019.01) | |
| *B60L 53/31* | (2019.01) | |
| *B60L 53/66* | (2019.01) | |
| *B60L 53/16* | (2019.01) | |
| *B60L 53/39* | (2019.01) | |

(52) U.S. Cl.
CPC .............. *B60L 53/66* (2019.02); *B60L 58/12* (2019.02); *B60L 58/22* (2019.02); *H02J 7/0027* (2013.01); *H02J 7/0045* (2013.01); *B60L 2240/36* (2013.01); *B60L 2240/545* (2013.01); *B60L 2240/547* (2013.01); *B60L 2240/70* (2013.01); *B60L 2250/16* (2013.01); *B60L 2250/20* (2013.01); *B60L 2250/30* (2013.01)

(56) References Cited

U.S. PATENT DOCUMENTS

| | | | |
|---|---|---|---|
| 10,661,669 B1 | 5/2020 | Torok et al. | |
| 2010/0201309 A1* | 8/2010 | Meek | B60L 53/34 |
| | | | 320/108 |
| 2011/0302078 A1 | 12/2011 | Failing | |
| 2012/0025761 A1* | 2/2012 | Takada | H02J 5/005 |
| | | | 320/108 |
| 2012/0029750 A1* | 2/2012 | Ortmann | B60L 53/37 |
| | | | 701/22 |
| 2013/0012044 A1* | 1/2013 | Maurer | H01R 13/22 |
| | | | 439/246 |
| 2013/0175987 A1* | 7/2013 | Amma | H01M 10/46 |
| | | | 320/108 |
| 2014/0095026 A1* | 4/2014 | Freitag | B60L 11/1829 |
| | | | 701/37 |
| 2015/0360577 A1* | 12/2015 | Greenwood | H02J 7/025 |
| | | | 320/108 |
| 2016/0023565 A1 | 1/2016 | Bell et al. | |
| 2016/0288656 A1* | 10/2016 | Kristof | B60L 11/182 |
| 2017/0096073 A1 | 4/2017 | Mardall et al. | |
| 2017/0106762 A1* | 4/2017 | Dow | H02J 7/0045 |
| 2017/0225582 A1* | 8/2017 | Augst | H02J 50/10 |
| 2018/0264963 A1* | 9/2018 | Dudar | H02J 7/025 |
| 2019/0023141 A1* | 1/2019 | Huang | B60L 11/1833 |
| 2019/0176633 A1* | 6/2019 | Booth | H01R 13/10 |

OTHER PUBLICATIONS

Office Action dated Jun. 27, 2019 for U.S. Appl. No. 15/837,862, Booth, "Underbody Charging of Vehicle Batteries", 9 pages.

Final Office Action dated Dec. 20, 2019 for U.S. Appl. No. 15/837,862 "Underbody Charging of Vehicle Batteries," Booth, 8 pages.

Office action for U.S. Appl. No. 15/837,862, dated Jun. 27, 2019, Booth, "Underbody Charging of Vehicle Batteries," 9 pages.

* cited by examiner

UNDERBODY CHARGING OF VEHICLE BATTERIES

BACKGROUND

Electric vehicles often rely on rechargeable batteries to supply electrical power to various components, such as electric motors. Recharging the battery may present a number of technical considerations. For example, the convenience, the duration, and the safety associated with the charging process may be important factors. For example, due to the relatively limited range of some electric vehicles, providing recharging devices at numerous and convenient locations may be a consideration. In addition, reducing the time necessary for recharging the battery may be important for some uses of electric vehicles.

In some conventional-charging devices where electrical connectors having pintype connectors are used, the connectors may be insufficiently durable for frequent use. This may result in such electrical connectors being unsuitable for uses that might include thousands of connections and disconnections, such as, for example, a fleet of electric vehicles that operate in a substantially constant manner, requiring frequent charging cycles.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
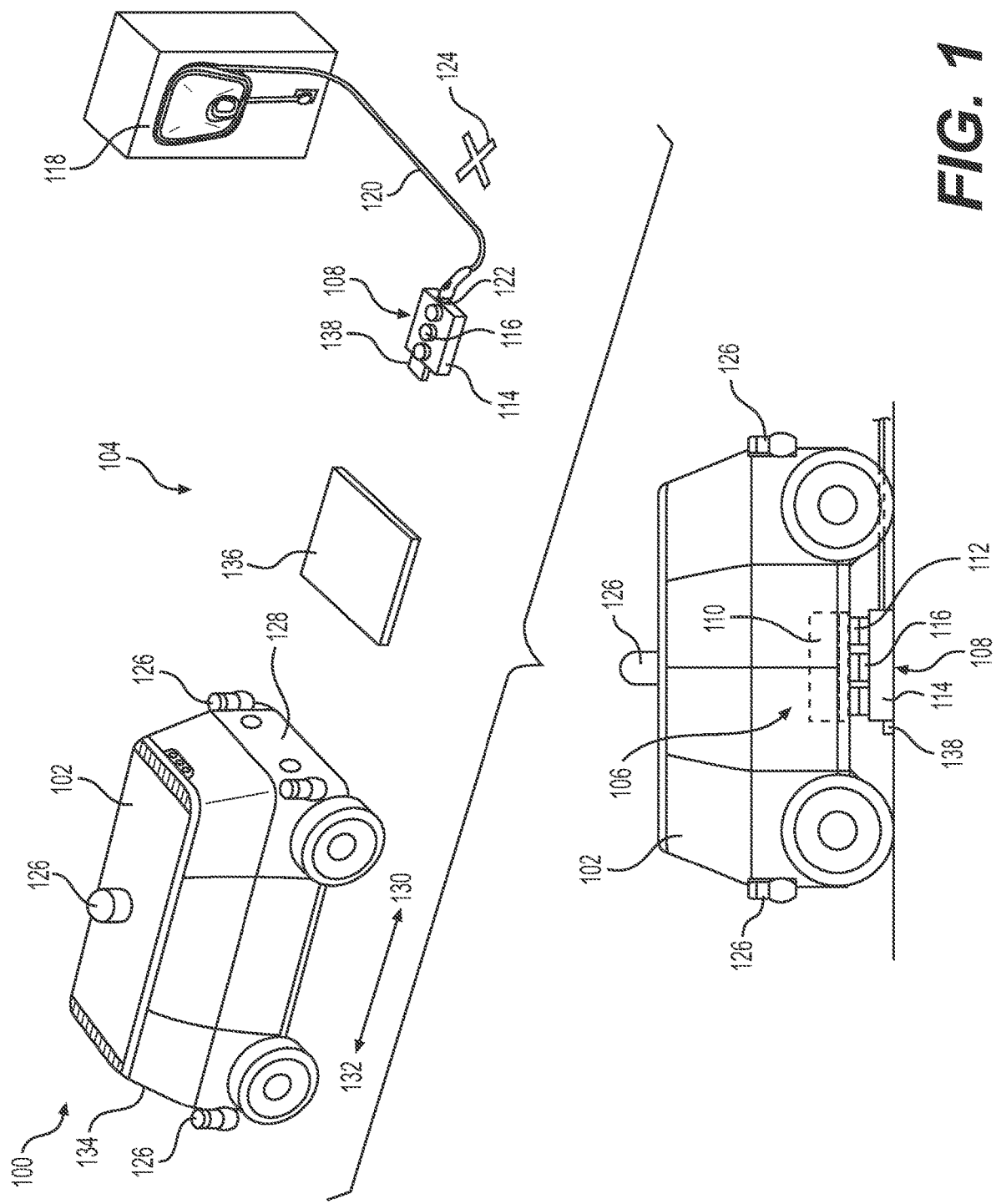
FIG. 1 is an example environment in which an example vehicle is maneuvering into position during an example recharging event.

As noted above, some conventional charging devices include a power cable having an electrical connector for connecting with a mating electrical connector coupled to the electric vehicle so that electrical power may be supplied to the battery of the vehicle during charging. Some electrical connectors are pin-type connectors that include pins configured to fit into corresponding recesses including electrical contacts for electrically connecting the power cable to the battery of the vehicle. Although pin-type electrical connectors may be sufficient for some uses, such as residential use, for systems expected to be used frequently and by different users, thereby resulting in frequent connections and disconnections, pin-type electrical connectors may be insufficiently durable for such uses. This may result in such electrical connectors being unsuitable for uses that might include thousands of connections and disconnections, such as, for example, a fleet of electric vehicles that operate in a substantially constant manner, requiring frequent charging cycles.

This disclosure is generally directed to methods, apparatuses, and systems for charging one or more batteries of a vehicle having one or more electrical propulsion units. For example, a system for charging one or more batteries may include a charging box mounted to the underside of the vehicle to facilitate connection to a charge coupler from under the vehicle, with the charge coupler being configured to provide an electrical connection between an electrical power source and the charging box. A vehicle including the charging box may maneuver to a position above the charge coupler, after which electrical contacts of the charging box and the charge coupler may be brought into contact with one another. Once in contact with one another, the charge coupler and/or the charging box may be configured to provide electrical communication between the electrical power source and the one or more batteries, so that the electrical power source may increase the state of charge of one or more of the batteries. Thereafter, the electrical contacts of the charging box and the electrical contacts of the charge coupler may be separated from one another, and the vehicle may maneuver away from the position over the charge coupler. In this example manner, the one or more batteries of the vehicle may be recharged without a person manually connecting the electrical power source to the vehicle. As a result, the system does not necessarily need relatively complex electrical connectors, such as, for example, pin-type connectors, thus potentially rendering the system more durable and providing greater longevity of use. Furthermore, because a person is not required to manually connect the connectors, the connectors may be sized to be much larger, allowing much more current to flow with much lower heat created.

This disclosure is also generally directed to a system for charging one or more batteries of a vehicle including one or more electrical propulsion units. The system may include a charging box configured to be mounted to the underside of the vehicle to facilitate electrical connection to a charge coupler from under the vehicle. The charging box may be configured to be electrically connected to the one or more batteries to increase a state of charge of one or more of the batteries. The charging box may include a case and positive and negative electrical contacts coupled to the case and configured to be accessible from under the vehicle. Some examples of the charging box may also include a ground contact. The charging box may also include one or more electrical connectors coupled to the case and configured to provide an electrical connection between the positive electrical contact and the one or more batteries, and between the negative electrical contact and the one or more batteries.

In some examples, the system may also include a transmitter configured to transmit a signal to the charge coupler to activate the charge coupler to charge the one or more batteries. In some examples, the transmitter may be configured to induce electrical current in a receiver coupled to the charge coupler. For example, the system may include an electrical power transmitter configured to transmit electrical power to the charge coupler. For example, the charging box may include a transmitter, which may include a near-field communication (NFC) transmitter (or other wireless transmission protocol) configured to activate the charge coupler based at least in part on a distance between the NFC transmitter and a receiver electrically coupled to the charge coupler. In some examples, the NFC transmitter may be physically incorporated into the charging box. In some examples, the NFC transmitter may be physically incorporated into the vehicle but remotely from the charging box. In some examples, the charge coupler may include an NFC receiver, and the NFC transmitter and NFC receiver may be configured, such that electrical current is induced in the NFC receiver upon receipt of a transmission from the NFC transmitter, effectively transmitting electrical power from the NFC transmitter to the NFC receiver when the NFC transmitter and NFC receiver are within transmission range of one another. In some examples, when the current is induced and the charge coupler is activated, the circuitry in the charge coupler may control transfer of electrical power from the electrical power source to the electrical contacts of the charge coupler and thereafter to the electrical contacts of the vehicle. In some such examples, the charge coupler may be prevented from being activated until and/or unless the vehicle is positioned over the charge coupler, and in some examples, positioned so that the electrical contacts of the charging box and the electrical contacts of the charge coupler may be brought into contact with one another. This may increase the safety of the system by reducing the likelihood that a person contacts one or more of the electrical contacts of the charge coupler when the electrical contacts are energized, thereby potentially preventing electric shock. In some examples, the electrical contacts of the charge coupler are not energized until or unless the charge coupler receives a communication indicating that the vehicle is positioned over the electrical contacts of the charge coupler. In some examples, it may be sufficient to receive a threshold amount of power from the vehicle to indicate that the contacts should be energized. Other types of transmitters and receivers are contemplated. For example, visual tags (bar codes, QR codes, Augmented Reality (AR) tags, etc.), RFID, GPS, or the like may be used to determine or confirm whether the charging box and the charge coupler are within sufficient range of one another for providing electrical contact between the electrical contacts of the charging box and the electrical contacts of the charge coupler.

In some examples, the vehicle may include two or more batteries. For example, the vehicle may include two or more propulsion units, each including one or more electric motors and one or more batteries, for example, as explained herein. For such examples, the system may include a charge controller configured to distribute charging between the two or more batteries. For example, the charge controller may balance the respective states of charge of each of the two or more batteries. For example, the charge controller may be configured to determine which of the two or more batteries is at a relatively lower state of charge, and charge that battery until its state of charge substantially matches the state of charge of the other battery or batteries. In some examples, thereafter the charge controller may charge the two or more batteries concurrently or substantially simultaneously (e.g., within technical tolerances) until they each reach a desired state of charge. In some examples, the charge controller may be physically incorporated into the charging box. In some examples, the charge controller may be physically incorporated into the vehicle but remotely from the charging box.

This disclosure is also generally directed to a method for charging one or more batteries of a vehicle including one or more electrical propulsion units. The method may include maneuvering the vehicle to a position over a charge coupler configured to electrically connect one or more electrical contacts of the vehicle to an electrical power source to increase a state of charge of the one or more batteries. The method may also include providing electrical connection between the electrical contacts of the vehicle and electrical contacts coupled to a charge coupler configured to increase the state of charge of the one or more batteries. The method may further include electrically coupling the charge coupler to the one or more batteries and increasing the state of charge of the one or more batteries.

In some examples, the method may also include transmitting power from a transmitter electrically coupled to the vehicle to the charge coupler. For example, transmitting power may include communicating electrical power via an inductive power coupling coupled to the vehicle, for example, as described herein. Maneuvering the vehicle may include generating one or more trajectories using a perception module and/or a trajectory module associated with the vehicle, and moving the vehicle according to the one or more trajectories.

In some examples, maneuvering the vehicle may include identifying a marker associated with the charge coupler, generating one or more trajectories based at least in part on identifying the marker, and moving the vehicle according to the one or more trajectories. For example, the vehicle may be an autonomous vehicle including a perception module that may include one or more sensors configured to generate one or more signals indicative of the environment around the vehicle. For example, the perception module may include one of more image capture devices, one or more light detecting an ranging (LIDAR) sensors, one or more sound navigation and ranging (SONAR) sensors, one or more radio detection and ranging (RADAR) sensors, or the like, and the perception module may be configured to identify the marker and maneuver the vehicle based at least in part on the position of the marker, so that the electrical contacts of the charging box are sufficiently aligned with the electrical contacts of the charge coupler for contacting the electrical contacts to one another. For example, the vehicle may have a trajectory module configured to generate one or more trajectories for the vehicle to follow, so that the electrical contacts of the charging box and the electrical contacts of the charge coupler may be contacted to one another. In some examples, the marker may be an optical marker and/or an RF beacon. In some examples, the marker may be one or more of a physical marker (e.g., having a LIDAR reflective surface), a QR code, an AR tag, an RFID tag. Additionally, or alternatively, the system may monitor Wi-Fi signals to perform Wi-Fi simultaneous localization and mapping (SLAM), and/or any other localization method, to maneuver the vehicle to the charge coupler.

In some examples of the method, maneuvering the vehicle may include receiving one or more signals from a location remote from the vehicle configured to provide one or more trajectories for maneuvering the vehicle into the position over the charge coupler. For example, the vehicle may include a communication module configured to communicate via a communications network to a remotely located teleoperations system, and the teleoperations system may be configured to provide the one or more trajectories. In some examples, the teleoperations system may include an interface configured to facilitate communication between the vehicle and a human, who may provide the one or more trajectories or guidance for the perception module and/or trajectory module to determine the one or more trajectories. In some examples, an operator may control the vehicle either via a remote control, or using gestures and movements recognizable to the vehicle, to position the vehicle in a position for charging.

In some examples, providing electrical contact between the electrical contacts of the vehicle and the electrical contacts of the charge coupler may include one or more of lowering the vehicle or raising the charge coupler. For example, the vehicle may include active suspension configured to, for example, raise and/or lower the ride height of the vehicle, and to provide electrical contact between electrical contacts of the vehicle (e.g., the electrical contacts of the charging box) and the electrical contacts of the charge coupler, which may include lowering the vehicle via the active suspension until the electrical contacts contact one another. In some examples, the vehicle may be lowered such that the electrical contacts coupled to the vehicle remain substantially level. In some examples, the electrical contacts coupled to the vehicle may be configured to move relative to the vehicle until the electrical contacts contact one another. In some examples, the charge coupler may be configured to raise toward the underside of the vehicle so that the electrical contacts of the charge coupler are contacted with the electrical contacts of the vehicle (e.g., the electrical contacts of the charging box). For example, the charge coupler may be mounted to an actuator configured to raise the charge coupler, for example, relative to the surface on which the charge coupler is mounted (e.g., the ground or floor of a service center). In some examples, the vehicle and/or charging box may lower itself, and the charge coupler may rise toward the charging box, so that the electrical contacts contact one another.

In some examples, the method may also include closing one or more switches between the one or more batteries and the charge coupler, so that the electrical power from the electrical power source is supplied to the one or more batteries. For example, the vehicle (e.g., the charging box) may include a charge controller configured to facilitate electrical connection between the electrical power source and the one or more batteries. The charge controller in some examples may be configured to detect contact between the electrical contacts of the charge coupler and the electrical contacts of the charging box, and based at least in part on the detection, close the one or more switches to electrically connect the electrical power source to the one or more batteries for increasing the state of charge of the one or more batteries. In some examples, the charge controller may be configured to detect contact by one or more of receiving data from circuitry powered by receipt of the transmission from the transmitter, detecting a current, voltage, or other impedance from the inductive coupling, detecting an impedance across the electrical contacts of the vehicle, and/or detecting a temperature change.

In some examples, the method may also include separating the electrical contacts coupled to the vehicle from the electrical contacts coupled to the charge coupler. For example, the active suspension of the vehicle and/or an actuator coupled to the charge coupler may activate to separate the electrical contacts from one another. For example, the active suspension may raise the ride height of the vehicle and/or the actuator may lower the electrical contacts of the charge coupler, thereby separating the electrical contacts of the charging box from the electrical contacts of the charge coupler from one another. Thereafter, the vehicle may maneuver away from its position over the charge coupler.

In some examples, the method may also include confirming a voltage decay in the electrical contacts coupled to the vehicle following the separation of the electrical contacts from one another. For example, the charge controller may be configured to receive one or more signals from the electrical contacts of the charging box indicative of the voltage at the contacts. In some examples, if the charge controller receives one or more signals indicative that the voltage of the contacts is dropping, the charge controller will communicate one or more signals to the vehicle indicating that the vehicle may maneuver away from the charge coupler. In some examples, if the charge controller receives one or more signals indicative that the voltage of the contacts is not dropping, the charge controller will communicate one or more signals to the vehicle indicating that the vehicle should remain in position over the charge coupler. The one or more signals indicative of the failure of the voltage to drop may be an indication that the contacts of the charge coupler are still receiving electrical power from the electrical power source, and thus, the vehicle may be prevented from maneuvering away from the charge coupler, so that the electrical contacts of the charge coupler are not exposed while energized. This may provide improved safety by preventing a person from accessing the electrical contacts of the charge coupler when they are still energized.

This disclosure is also generally directed to a charge coupler. In some examples, the charge coupler may include a housing configured to be anchored (e.g., via an anchor) to a surface on which a vehicle is supported. In some examples, the housing may be configured to be disconnected and/or separated from the surface and moved to another location. For example, the anchor may be configured to facilitate ease of disconnection and/or separation from the surface. The charge coupler may also include an electrical connector configured to be coupled to an electrical power source. For example, the electrical power source may be a conventional charging apparatus for recharging a rechargeable battery, such as, for example, a charging apparatus having pin-type a connector that might be used to physically and electrically couple the charging apparatus to a mating connector on an electric vehicle.

The charge coupler may also include one or more electrical contacts coupled to the housing and configured to be electrically coupled to one or more electrical contacts coupled to a vehicle from under the vehicle. For example, the one or more electrical contacts may include one or more of a positive contact, a negative contact, or a ground contact.

In some examples, the charge coupler may further include a receiver configured to receive a signal for activating the charge coupler and electrically coupling the electrical power source to the one or more electrical contacts of the vehicle. For example, as mentioned above, the receiver may be configured to receive a signal configured to induce an electrical current in the receiver. For example, the receiver may include a receiver configured to induce electrical current upon receipt of a signal from an NFC transmitter coupled to the vehicle or charging box.

In some examples, the charge coupler may also include an actuator coupled to the housing and configured move the housing toward the one or more electrical contacts of the vehicle (e.g., mounted to the underside of the vehicle). For example, the actuator may include an electric actuator, a pneumatic actuator, a hydraulic actuator, or any other type of actuator configured to elevate the housing and/or electrical contacts toward the vehicle.

In some examples, the charge coupler may include a power cable coupled to the electrical connector of the charge coupler and configured to be coupled to the electrical power source. The power cable may include one or more of a positive cable, a negative cable, or a ground cable. In some examples, the charge coupler may also include a controller configured to detect whether the charge coupler is electrically coupled to the electrical power source.

The techniques and systems described herein may be implemented in a number of ways. Example implementations are provided below with reference to the figures.

FIG. 1 is an example environment 100 in which an example vehicle 102 is maneuvering into position during an example recharging event. The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more electric motors, one or more internal combustion engines, any combination thereof (e.g., a hybrid power train), and/or any other suitable electric power sources. For the purpose of illustration, the example vehicle 102 is an at least partially electrically powered vehicle having two electrical propulsion units configured to provide the vehicle 102 with the ability to maneuver, each including a motor/inverter electrically coupled to one or more batteries configured to be recharged, as explained herein.

As shown in FIG. 1, the example vehicle 102 may be configured to use a charging system 104 for charging the one or more batteries coupled to the vehicle 102 and configured to provide electrical power for operation of the vehicle 102. The charging system 104 may include a charging box 106 coupled to the vehicle 102 to facilitate electrical connection to a charge coupler 108 from under the vehicle 102. For example, charging box 106 may be configured to be electrically connected to the one or more batteries of the vehicle 102 to facilitate increasing a state of charge of the one or more of the batteries. In the example shown, the charging box 106 includes a case 110 and electrical contacts 112, and the charge coupler 108 includes a housing 114 and complimentary electrical contacts 116 configured to electrically couple the charge coupler 108 to the charging box 106 to facilitate charging of the one or more batteries coupled to the vehicle 102. For example, each of the charging box 106 and charge coupler 108 may include positive, negative, and ground contacts configured to make electrical contact with one another, respectively, when the vehicle 102 is positioned such that the charging box 106 is positioned over (and substantially aligned with, as explained herein) the charge coupler 108, and the respective electrical contacts 112 and 116 are brought into contact with one another as explained herein. In some examples, the case 110 of the charging box 106 may be formed from material configured to block electromagnetic interference. Although the electrical contacts 112 of the charging box 106 and the electrical contacts 116 of the charge coupler 108 may be complimentary, they may not necessarily have a similar size and/or shape. The electrical contacts 112 of the charging box 106 and/or the electrical contacts 116 of the charge coupler 108 may have various contact surface sizes and shapes. For example, the electrical contacts 112 and/or the electrical contacts 116 may have circular, oblong, rectangular, square, polygonal, or the like contact surface shapes. In some examples, the electrical contacts 112 of the charging box 106 and the electrical contacts 116 of the charge coupler 108 have substantially planar contact surfaces (e.g., planar within technical and/or manufacturing limits), for example, configured to provide respective complimentary planar contact surfaces for providing respective relatively large surface areas through which electrical current may flow. In some examples, the relatively larger surface areas may improve the speed and/or efficiency of the charging. In some examples, the electrical contacts 112 and/or the electrical contacts 116 may be configured to be aligned linearly along the longitudinal axis or the latitudinal axis of the vehicle 102. In some examples, the electrical contacts 112 associated with the charging box 106 may be larger (or larger in one dimension) than the electrical contacts 116 of the charge coupler 108, or vice versa. In such examples, by oversizing one contact with respect to the other, the vehicle 102 need not exactly center the contacts with respect to one another. For example, if the electrical contacts 112 are ten centimeters larger in diameter than electrical contacts 116, the vehicle 102 may move up to ten centimeters in any direction and still achieve substantially one hundred-percent contact.

The charge coupler 108 may be configured to be coupled to an electrical power source 118 and facilitate transfer of electrical power from the electrical power source 118 to the electrical contacts 112 of the charging box 106 when the electrical contacts 112 of the charging box 106 are brought into contact with the electrical contacts 116 of the charge coupler 108. In some examples, the electrical power source 118 may be any source of electrical power sufficient to supply electric power for charging batteries of an electrically powered vehicle, such as, for example, an electric vehicle charging station. As shown in FIG. 1, the charge coupler 108 may include a power cable 120 coupled to an electrical connector 122 coupled to the charge coupler 108 and configured to be coupled to the electrical power source 118 to facilitate transfer of electrical power from the electrical power source 118 to the charge coupler 108. In some examples, the power cable 120 may include one or more of a positive cable, a negative cable, and a ground cable. In some examples, the electrical connector 122 may be configured to transmit one or more of data or electrical power between the charge coupler 108 and the electrical power source 118, for example, via a standard electrical connection (e.g., a standard electrical connection and/or according to a standard protocol, such as, for example, SAE J1772-CCS1, CHAdeMO, IEC-type 2, or the like).

As explained in more detail herein, to increase the state of charge of the one or more batteries of the vehicle 102, the vehicle 102 may be maneuvered to a position over the charge coupler 108, such that the electrical contacts 112 of the charging box 106 under the vehicle 102 are substantially aligned with the electrical contacts 116 of the charge coupler 108 (e.g., within geometric constraints of the contacts to optimize current flow). As explained herein, in some examples, the vehicle 102 may be an autonomous vehicle, and the charging system 104 may include one or more markers, such as marker 124, that may be used by the vehicle 102 maneuver into the substantially aligned position, for example, using a perception system including one or more sensors 126 to detect the marker 124. In some examples, the marker 124 may include one or more of a physical marker (e.g., having a LIDAR reflective surface), an optical marker (e.g., a QR code, an AR tag, or the like), an RFID tag, an RF beacon. In some examples, vehicle sensors, including Wi-Fi receivers, may be used to localize the vehicle using a simultaneous localization and mapping (SLAM) algorithm.

For example, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

Although the example vehicle 102 has four wheels, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 128 of the vehicle 102 is the front end of the vehicle 102 when travelling in a first direction 130, and such that the first end 128 becomes the rear end of the vehicle 102 when traveling in the opposite, second direction 132, as shown in FIG. 1. Similarly, a second end 134 of the vehicle 102 is the front end of the vehicle 102 when travelling in the second direction 132, and such that the second end 134 becomes the rear end of the vehicle 102 when traveling in the opposite, first direction 130. These example characteristics may facilitate greater maneuverability, for example, in small spaces or crowded environments, such as parking lots and urban areas.

The vehicle 102 may travel through the environment 100, relying at least in part on sensor data indicative of objects in the environment 100 in order to determine trajectories of the vehicle 102. For example, as the vehicle 102 travels through the environment 100, one or more of the sensors 126 capture data associated with detected objects (e.g., vehicles, pedestrians, buildings, barriers, etc.). The sensors 126 may include one of more image capture devices, one or more LIDAR sensors, one or more SONAR sensors, one or more RADAR sensors, or the like. The data captured by the one or more sensors 126 may be used, for example, as input for determining trajectories for the vehicle 102.

Once positioned and aligned over the charge coupler 108, the electrical contacts 112 of the charging box 106 and the electrical contacts 116 of the charge coupler 108 may be brought into contact with one another, as explained herein, so that electrical power supplied by the electrical power source 118 may flow through the power cable 120 to the electrical contacts 116 of the charge coupler 108 and to the electrical contacts 112 of the charging box 106. The electrical contacts 112 of the charging box 106 may be electrically connected to the one or more batteries of the vehicle 102, and the state of charge of one or more of the batteries may be increased, for example, as explained in more detail herein. By providing the electrical contacts 112 of the charging box 106 coupled to the vehicle 102, so that they are accessible from the underside of the vehicle 102, unintended contact with a person may be prevented. As explained in more detail herein, some examples of the charging system 104 may be configured such that the electrical contacts 116 of the charge coupler 108 may not be energized unless the vehicle 102 is in position over the charge coupler 108, thereby preventing unintended contact with a person when the electrical contacts 116 of the charge coupler 108 are energized. As a result, the electrical contacts 112 of the charging box 106 and/or the electrical contacts 116 of the charge coupler 108 may have a relatively large and robust contact surface area to increase the useful service life of the electrical contacts 112 and/or 116. In some examples, though not illustrated in FIG. 1, a physical barrier, which may or may not be formed from a conductive material (e.g., for EMI considerations) and which may be formed from a resilient (e.g., compliant) material may form a gasket around the connection from the bottom surface of vehicle 102 to the ground such that living being (human, animal, etc.) may not inadvertently make contact while the vehicle 102 is charging.

In some examples, the electrical contacts 112 of the charging box 106 may be generally exposed as viewed from the underside of the vehicle 102. As a result, the electrical contacts 112 of the charging box 106 may become soiled with dirt, sand, salt, oil, and/or other grit resulting from travel on the road. Some examples of the charging system 104 may include cleaning device 136 configured to reduce or remove such substances from the electrical contacts 112 of the charging box 106. For example, as shown in FIG. 1, the cleaning device 136 may be configured to be positioned on the surface on which the vehicle 102 travels, so that as the vehicle 102 passes over the cleaning device 136, the cleaning device 136 reduces or removes substances from the surface(s) of the electrical contacts 112 of the charging box 106. As several non-limiting examples, the cleaning device 136 may deliver streams of one or more of air, water, steam, cleaning solvents, and the like to the underside of the vehicle 102 to remove debris, etc. Furthermore, such solvents may additionally, or alternatively, include compounds to remove rust, prevent corrosion, or otherwise ensure electrical connections with the electrical contacts 112 are optimized. This may improve physical contact between the electrical contacts 112 of the charging box 106 and the electrical contacts 116 of the charge coupler 108, and/or prolong the useful service life of the electrical contacts 112 and/or 116. Although the cleaning device 136 is shown in FIG. 1 as a device physically separate from the vehicle 102, in some examples, the cleaning device 136 may be coupled to the vehicle 102. In some examples, the cleaning device 136 may be coupled to the charge coupler 108 or may take the form of an automated service robot.

As shown in FIG. 1, the charging system 104 may also include an anchor 138 associated with the surface on which the charge coupler 108 is positioned and configured to selectively hold the charge coupler 108 in position. For example, the charge coupler 108 may be intended to be either portable or fixed in location on the surface, and the anchor 138 may be configured to selectively secure the charge coupler 108 in a fixed position or permit its repositioning using, for example, known securement assemblies, such as fasteners, clamps, etc.

Figure 2:
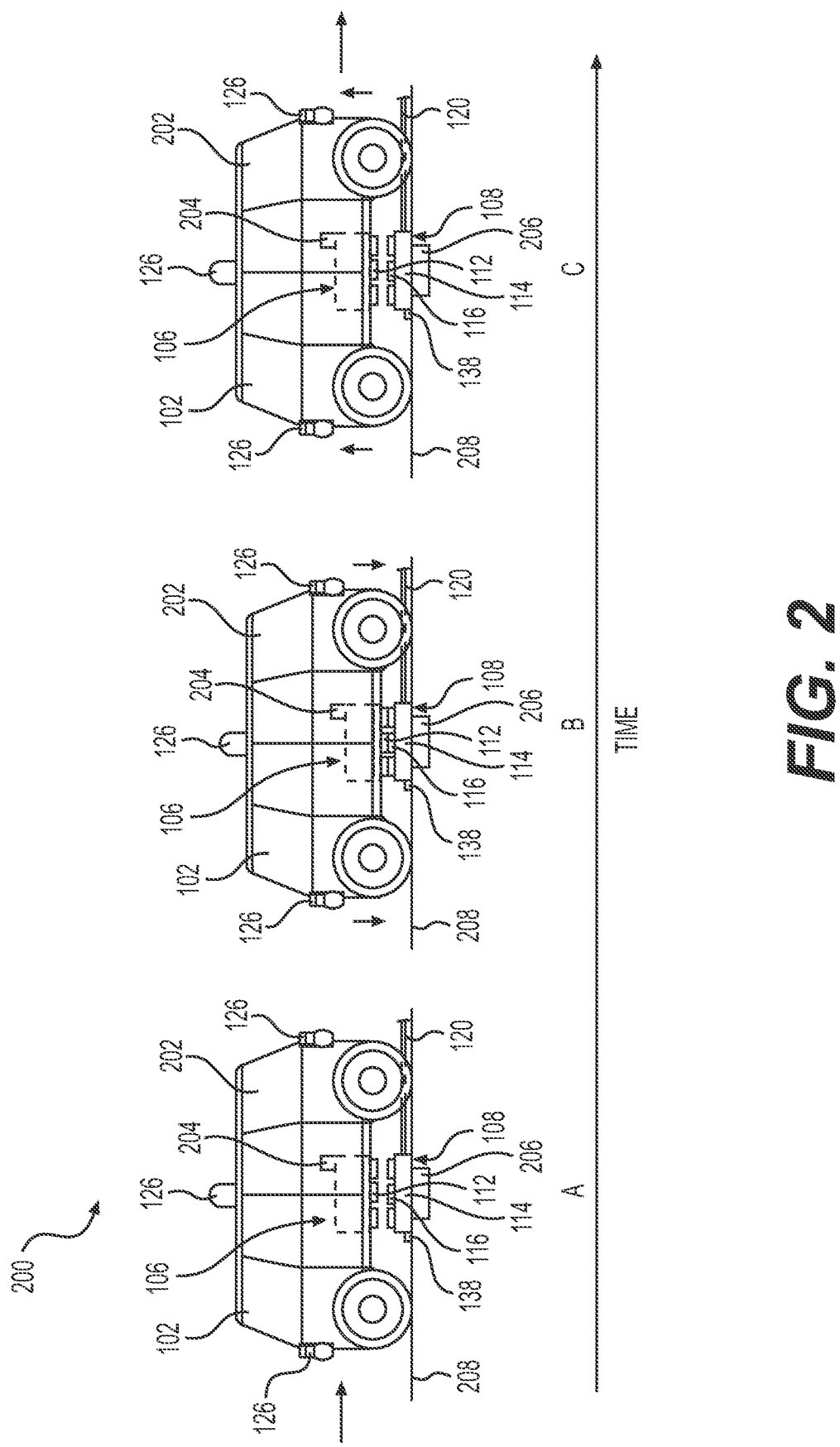
FIG. 2 is an example diagrammatic representation of an example vehicle recharging sequence.

FIG. 2 is an example diagrammatic representation of an example vehicle recharging sequence 200 in which the example vehicle 102 maneuvers to a position over the charge coupler 108 at time corresponding to A, causes the electrical contacts 112 of the charging box 106 to come into contact with the electrical contacts 116 of the charge coupler 108 at a time corresponding to B so that electrical power can be transferred to one or more batteries of the vehicle 102, and cause separation of the electrical contacts 112 and the electrical contacts 116 from one another at a time corresponding to C, so that the vehicle 102 can maneuver away from the charge coupler 108.

In some examples of the sequence 200, providing electrical contact between the electrical contacts 112 of the charging box 106 and the electrical contacts 116 coupled to the charge coupler 108 (at B) may include one or more of lowering the vehicle 102 or raising the charge coupler 108.

For example, as shown in FIG. 2, the vehicle 102 may include active suspension (see FIG. 3) configured to, for example, raise and lower the ride height of the vehicle 102, and provide electrical contact between electrical contacts 112 of the charging box 106 and the electrical contacts 116 of the charge coupler 108. For example, a chassis 202 of the vehicle 102 may be lowered via the active suspension until the electrical contacts 112 and the electrical contacts 116 contact one another. In some examples, the chassis 202 of vehicle 102 may be lowered such that the electrical contacts 112 remain substantially level. In some examples, the electrical contacts 112 may be configured to move relative to the vehicle 102. For example, the charging box 106 including the electrical contacts 112 may be mounted to move relative to the chassis 202, for example, via an actuator 204 (e.g., an electric, pneumatic, and/or hydraulic actuator), until the electrical contacts 112 and the electrical contacts 116 of the charge coupler 108 contact one another. In some examples, the charge coupler 108 may be configured to raise toward the underside of the vehicle 102, so that the electrical contacts 116 of the charge coupler 108 are contacted with the electrical contacts 112 of the charging box 106. For example, the charge coupler 108 may be mounted to an actuator 206 (e.g., an electric, pneumatic, and/or hydraulic actuator) configured to raise the charge coupler 108, for example, relative to the surface 208 on which the charge coupler 108 is mounted (e.g., the ground or floor of a service center). In some examples, the chassis 202 of the vehicle 102 and/or the charging box 106 may lower itself, and the charge coupler 108 may rise toward the charging box 106, so that the electrical contacts 112 and 116 contact one another.

Figure 3:
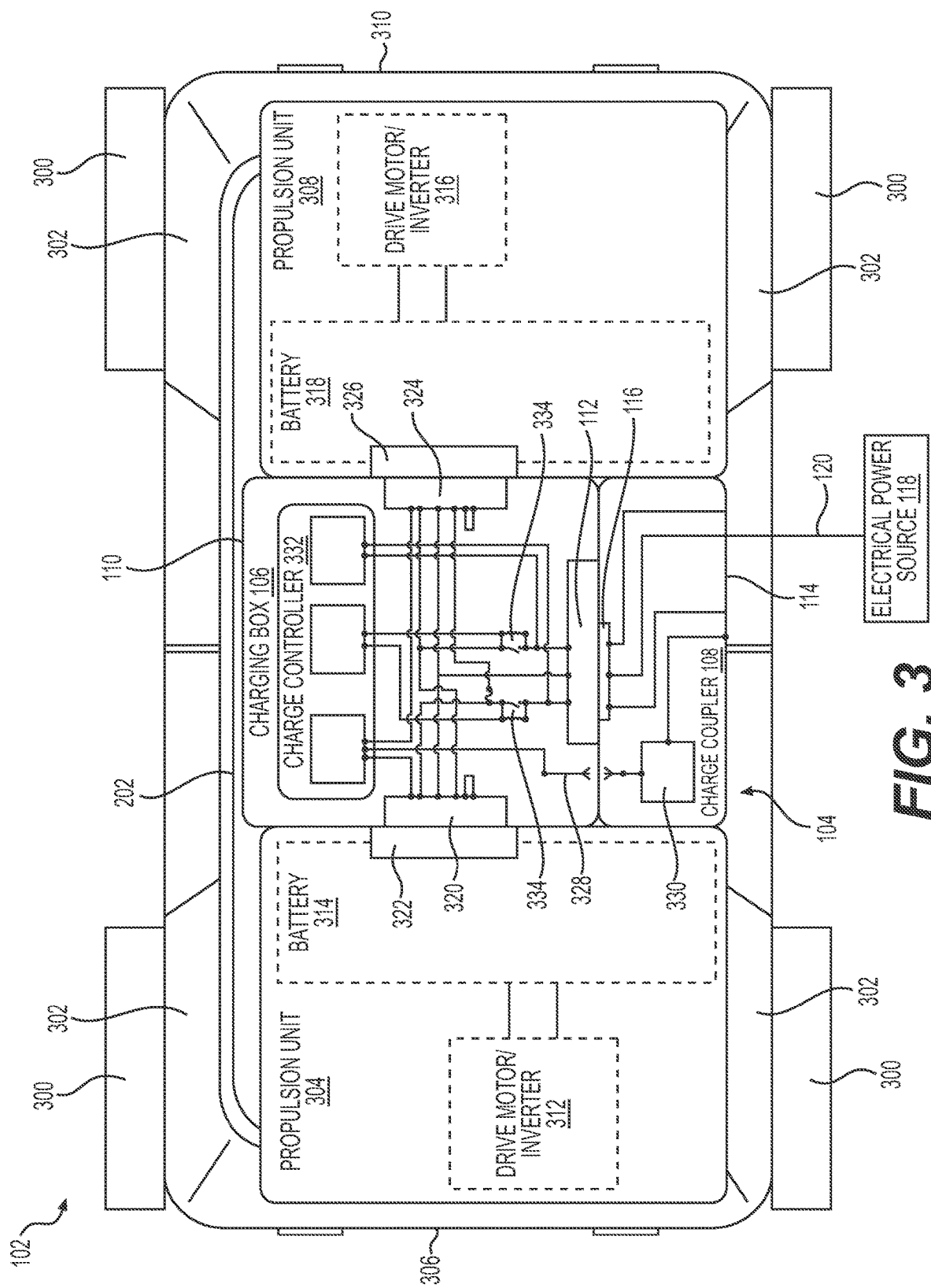
FIG. 3 is a schematic diagram of an example vehicle and an example system for charging one or more batteries coupled to the vehicle.

FIG. 3 is a schematic diagram of an example vehicle 102 and an example charging system 104 for charging one or more batteries coupled to the vehicle 102. Although FIG. 3 shows relative orientations and relative positions of various components, for example, the example vehicle 102, the example charge coupler 108 and the example electrical power source 118, both of which may be physically separate from the vehicle 102, other relative orientations and relative positions are contemplated. For example, although for the sake of explanation the charge coupler 108 is schematically depicted as apparently positioned within the vehicle 102, the charge coupler 108 is separate from the vehicle 102, and the electrical contacts 116 of the charge coupler 108 may be selectively contacted with, and separated from, the electrical contacts 112 of the vehicle 101, as explained herein. FIG. 3 schematically depicts the electrical contacts 116 of the charge coupler 108 contacting the electrical contacts 112 of the vehicle 102. Other components described with respect to FIG. 3 may have other relative positions and/or relative orientations.

The example vehicle 102 shown in FIG. 3 includes a chassis 202, four wheels 300 coupled to the chassis 202 via suspension 302 (e.g., active suspension configured to alter a distance between the chassis 202 and a surface supporting the vehicle 102), a first electrical propulsion unit 304 coupled adjacent a first end 306 of the chassis 202, and a second electrical propulsion unit 308 coupled adjacent a second end 310 of the chassis 202 opposite the first end 306 of the chassis 202. In some examples, the suspension 302 may be active suspension and may include adjustable springs and/or dampers configured to lower and/or raise the ride height of the vehicle 102 (e.g., change the distance between the lower side of the chassis 202 and the surface on which the vehicle 102 is supported by its wheels 300). In some examples, the first and second electrical propulsion units 304 and 308, respectively, are configured to supply torque to two or more (e.g., four) of the wheels 300 for maneuvering the vehicle 102. As shown in FIG. 3, in some examples, the first electrical propulsion unit 304 includes a first drive motor/inverter 312 and a first battery 314 electrically coupled to the first electrical propulsion unit 304 and configured to supply and/or receive electrical power to and/or from the first drive motor/inverter 312. Similarly, the second electrical propulsion unit 308 includes a second drive motor/inverter 316 and a second battery 318 electrically coupled to the second electrical propulsion unit 308 and configured to supply and/or receive electrical power to and/or from the second drive motor/inverter 316. In some examples, the first battery 314 and/or the second battery 318 may each include more than one battery, such as two or more batteries electrically connected in series or parallel to one another.

As shown schematically in FIG. 3, the example vehicle 102 includes the charging box 106 including the electrical contacts 112 configured to provide electrical communication between the first and second batteries 314 and 318 and the charge coupler 108, which is shown schematically in electrical contact with the charging box 106, such that the electrical contacts 112 of the charging box 106 are in electrical contact with the electrical contacts 116 of the charge coupler 108. The example charging system 104 shown in FIG. 3 also includes an electrical power source 118 electrically coupled to the charge coupler 108 via the power cable 120.

In the example shown, the charging box 106 also includes an electrical connector 320 positioned on the case 110 at an end of the case 110 adjacent the first electrical propulsion unit 304 for electrically coupling the charging box 106 to the first battery 314 of the first electrical propulsion unit 304 via, for example, an electrical connector 322 of the first electrical propulsion unit 304. The example charging box 106 also includes an electrical connector 324 positioned on the case 110 at an end of the case 110 adjacent the second electrical propulsion unit 308 for electrically coupling the charging box 106 to the second battery 318 of the second electrical propulsion unit 308 via, for example, an electrical connector 326 of the second electrical propulsion unit 308. Though illustrated as two electrical connectors 322 and 324 in FIG. 3, any number of connectors is contemplated (e.g., none, where the charging box 106 is electrically integrated with the one or more batteries, one connector, or more connectors than two, etc.).

In the example shown in FIG. 3, the charging system 104 also includes an electrical power transmitter 328 configured to transmit electrical power to the charge coupler 108. For example, the charging box 106 may include the electrical power transmitter 328, which may include an NFC transmitter configured to activate the charge coupler 108 based at least in part on a distance between the NFC transmitter and a receiver 330 electrically coupled to the charge coupler 108. In some examples, the transmitter 328 may be physically incorporated into the charging box 106, or in some examples, the transmitter 328 may be physically incorporated into the vehicle 102 but remotely from the charging box 106. In some examples, the receiver 330 may include an NFC receiver, and the NFC transmitter 328 associated with the vehicle 102 and NFC receiver 330 may be configured such that electrical power is transmitted from the NFC transmitter 328 to the NFC receiver 330 when the NFC transmitter 328 and NFC receiver 330 are within transmission range of one another. In some such examples, the charge coupler 108 may be prevented from being activated until and/or unless the vehicle 102 is positioned over the charge coupler 108, and in some examples, positioned so that the electrical contacts 112 of the charging box 106 and the electrical contacts 116 of the charge coupler 108 may be brought into contact with one another. In some examples, the charge coupler 108 may be configured to transmit a signal back to the charging box 106 to confirm contact between the electrical contacts 112 of the charging box and the electrical contacts 116 of the charge coupler 108. In some examples, the charge coupler 108 may also transmit one or more signals to the vehicle 102 (e.g., a controller of the vehicle 102) confirming that the vehicle 102 is in a suitable position for charging to occur. In some examples, the transmitter 328 may be a transceiver capable of receiving signals, for example, transmitted by the receiver 330, which may in some examples be a transceiver. In some examples, one or more of the charging box 106 or the charge coupler 108 may have separate a receiver and a separate transmitter. In some examples, upon receipt of the one or more signals from the charge coupler 108, the vehicle 102 may be prevented from drive capability and/or the suspension 302 may be locked in place, for example, so that the vehicle 102 may not be able to raise up and disconnect the electrical contacts 112 of the charging box 106 from the electrical contacts 116 of the charge coupler 108, unless charging has been discontinued and/or the electrical contacts 116 of the charge coupler 108 have been de-energized.

This may increase the safety of the charging system 104 by reducing the likelihood that a person contacts one or more of the electrical contacts 116 of the charge coupler 108 when the electrical contacts 116 are energized, thereby potentially preventing possible electric shock. Other types of transmitters and receivers are contemplated. As a non-limiting example, control circuitry contained in the charge coupler 108 may be self-contained (e.g., isolated from power provided from the electrical power source 118), so that it is powered exclusively by power received wirelessly via the receiver 330. Once power is received, control circuitry may interact with other components of the system, such as, but not limited to, sending a signal (either wired or via a wireless communication, such as, but not limited to, BlueTooth, WiFi, NFC, etc.) to the electrical power source 118 to send power, sending a signal to the charge controller 332 to energize the electrical contacts 112, sending a signal to the vehicle 102 to lower an active suspension, or otherwise control one or more functions necessary to convey electric power from the electrical power source 118 to the one or more batteries (e.g., battery 314 and 318) of the vehicle 102.

The example charging system 104 shown in FIG. 3 also includes a charge controller 332 configured to distribute charging between the first battery 314 and the second battery 318. For example, the charge controller 332 may balance the respective states of charge of each of the first and second batteries 314 and 318. For example, the charge controller 332 may be configured to determine which of the first and second batteries 314 and 318 is at a relatively lower state of charge, and charge that battery until its state of charge substantially matches the state of charge of the other battery. In some examples, thereafter the charge controller 332 may charge the first and second batteries 314 and 318 concurrently or substantially simultaneously until they each reach a desired state of charge. In the example shown in FIG. 3, the charge controller 332 is physically incorporated into the charging box 106. In some examples, the charge controller 332 may be physically incorporated into the vehicle 102 but remotely from the charging box 106.

The example shown in FIG. 3 also includes switches 334 configured to selectively electrically connect the electrical contacts 112 of the charging box 106 with the first and second batteries 314 and 318. In some such examples, closing the switches 334 may facilitate the transfer of electrical power from the electrical power source 118 to the first and second batteries 314 and 318, and conversely disconnect the electrical power source 118 from the first and second batteries 314 and 318. For example, charge controller 332 may be configured to facilitate electrical connection between the electrical power source 118 and the first and second batteries 314 and 318 by controlling operation of the switches 334. For example, charge controller 332 in some examples may be configured to detect contact between the electrical contacts 116 of the charge coupler 108 and the electrical contacts 112 of the charging box 106, and based at least in part on the detection, close one or more of the switches 334 to electrically connect the electrical power source 118 to the first and second batteries 314 and 318 for increasing the state of charge of the first and second batteries 314 and 318. In some examples, the charge controller 332 may be configured to detect contact by one or more of receiving data from circuitry powered by receipt of the transmission from the transmitter 328, detecting a current, temperature, voltage, or other impedance from the inductive coupling, or detecting an impedance across the electrical contacts 112 of the vehicle 102.

In some examples, the system 104 may be configured to determine termination of charging. For example, the system 104 may be configured to monitor voltage and/or the state of charge of one or more of the batteries 314 and/or 318, and when a threshold has been reached, terminate the charging. In some examples, the system 104 may be configured to receive one or more signals from the vehicle 102 indicative that the vehicle 102 is initiating termination of the charging. Under such circumstances, the system 104 may cause decoupling of the electrical contacts 112 of the vehicle 102 from the electrical contacts 116 of the charge coupler 108, for example, as explained herein. In some examples, prior to decoupling, the electrical contacts 116 of the charge coupler 108 may be de-energized, for example, by disconnecting the electrical power source 118 from the electrical contacts 116 of the charge coupler 108.

In some examples, the charge controller 332 may be configured to detect a voltage decay in the electrical contacts 112 of the charging box 106 before and/or following the separation of the electrical contacts 112 of the charging box 106 and the electrical contacts 116 of the charge coupler 108 the from one another. For example, the charge controller 322 may be configured to receive one or more signals from the electrical contacts 112 of the charging box 106 indicative of the voltage at the electrical contacts 112. In some examples, if the charge controller 332 receives one or more signals indicative that the voltage of the electrical contacts 112 is dropping, the charge controller 332 will communicate one or more signals to the vehicle 102 (e.g., to a controller of the vehicle 102) indicating that the vehicle 102 may maneuver away from the charge coupler 108. In some examples, if the charge controller 332 receives one or more signals indicative that the voltage of the electrical contacts 112 of the charging box 106 is not dropping, the charge controller 332 will communicate one or more signals to the vehicle 102 indicating that the vehicle 102 should remain in position over the charge coupler 108. The one or more signals indicative of the failure of the voltage to drop may be an indication that the electrical contacts 116 of the charge coupler 108 are still receiving electrical power from the electrical power source 118, and thus, the vehicle 102 may be prevented from maneuvering away from the charge coupler 108, so that the electrical contacts 116 of the charge coupler 108 are not exposed while energized. This may provide improved safety by preventing a person from accessing the electrical contacts 116 of the charge coupler 108 when they are still energized.

Figure 4:
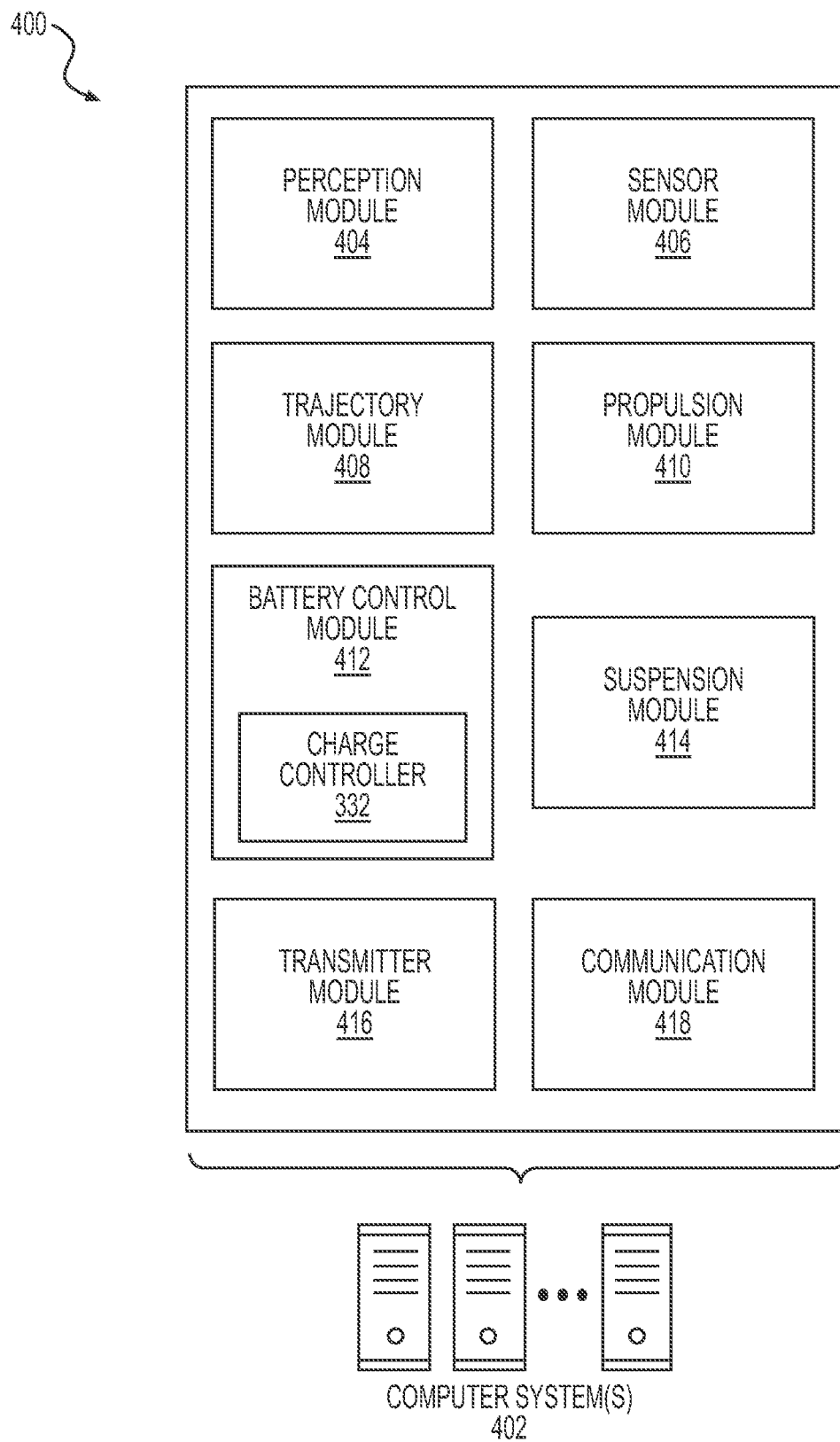
FIG. 4 is an example architecture including an example battery control module and an example charge controller for implementing a system for charging one or more batteries coupled to a vehicle.

FIG. 4 is an example architecture 400 for implementing the charging system 104 for charging one or more batteries coupled to a vehicle. For example, the architecture 400 may include one or more computer systems 402 including various hardware and/or software to implement aspects of the systems, methods, and apparatuses described herein. For example, the computer system(s) 402 may include one or more of a perception module 404, a sensor module 406, a trajectory module 408, a propulsion module 410, a battery control module 412, a suspension module 414, a transmitter module 416, or a communication module 418.

In some examples, the computer system(s) 402 may be embodied in an autonomous vehicle, such as, for example, the example vehicle 102 shown in FIG. 1. In some examples, the computer system(s) 402 may provide perception and planning functionality for the autonomous vehicle. The computer system(s) 402 may include any number or type of processors and/or sensors suitable for use in an autonomous vehicle, for example.

In some examples, the perception module 404 may be configured to receive location and environment sensor data and/or object data from one or more sensors associated with the sensor module 406. The sensor module 406 may include one or more of the sensors 126, which may include one or more image capture devices, LIDAR sensors, RADAR sensors, SONAR sensors, and/or any other sensors. The perception module 404 may receive object sensor data relevant to determine information associated with objects in the environment surrounding the vehicle 102.

In some examples, the trajectory module 408 may be configured to receive information from the perception module 404 and determine trajectories for the vehicle 102 to follow. For example, one or more of the sensors 126 may detect objects and/or the one or more markers (e.g., marker 124) associated with the charge coupler 108, which may be received by the perception module 404. The perception module 404 may communicate with the trajectory module 408, which, based at least in part on the information received from the perception module 404, determines trajectories for the vehicle 102 to follow, so that the vehicle 102 maneuvers using the propulsion module 410, which in the example described herein includes the first and second electrical propulsion units 304 and 308 to position the electrical contacts 112 of the charging box 106 over the electrical contacts 116 of the charge coupler 108, so the that the electrical contacts 112 and the electrical contacts 116 may be contacted to one another, for example, as described herein.

The example architecture 400 also includes the battery control module 412, which may be configured to at least partially control operation of one or more of the first battery 314 or the second battery 318. For example, the battery control module 410 may include the charge controller 332, which may at least partially control the recharging of the first battery 314 and/or the second battery 318, for example, as described herein.

The example architecture 400 shown in FIG. 4 also includes the suspension module 414, which may in some examples control operation of the suspension 302, for example, as described herein. For example, the suspension 302 may be active suspension configured to change the ride height of the vehicle 102, for example, as described herein.

The example architecture 400 also includes a transmitter module 416 configured to control operation of the transmitter 328 coupled to the vehicle 102 (e.g., coupled to the charging box 106). As described herein, the transmitter 328 may be an NFC transmitter configured to communicate electrical power to the receiver 330 (e.g., an NFC receiver), which may be used to activate the charge coupler 108, so that the electrical contacts 116 of the charge coupler 108 are energized. Conversely, the charge coupler 108 may be configured to energize the electrical contacts 116 if the receiver 330 of the charge coupler 108 receives electrical power from the transmitter 328 of the vehicle 102. This may prevent the electrical contacts 116 of the charge coupler 108 from being energized unless a transmitter is within range of the receiver 330. In some examples, the range may be, for example, less than one foot, less than six inches, or less than one inch.

The example architecture 400 shown in FIG. 4 also includes a communication module 418 configured to control communications via a communications network between the vehicle 102 and a remote location, such as a teleoperations system. In some examples, the teleoperations system may include an interface configured to facilitate communication between the vehicle 102 and a human, who may provide the one or more trajectories or guidance for the perception module 404 and/or the trajectory module 408 to determine the one or more trajectories for maneuvering the vehicle 102, for example, when the vehicle 102 is approaching the charge coupler 108. In some examples, the communication module 418 may be used for other communication purposes. In some examples, the human may be in proximity with the vehicle 102 and send commands using a remote control device via the communication module 418 and/or by performing gestures and/or movements recognizable by the perception module 404.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 400 (FIG. 4) is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 400 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 400. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 400 may be transmitted to the architecture 400 via transmission media or signals, such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 5:
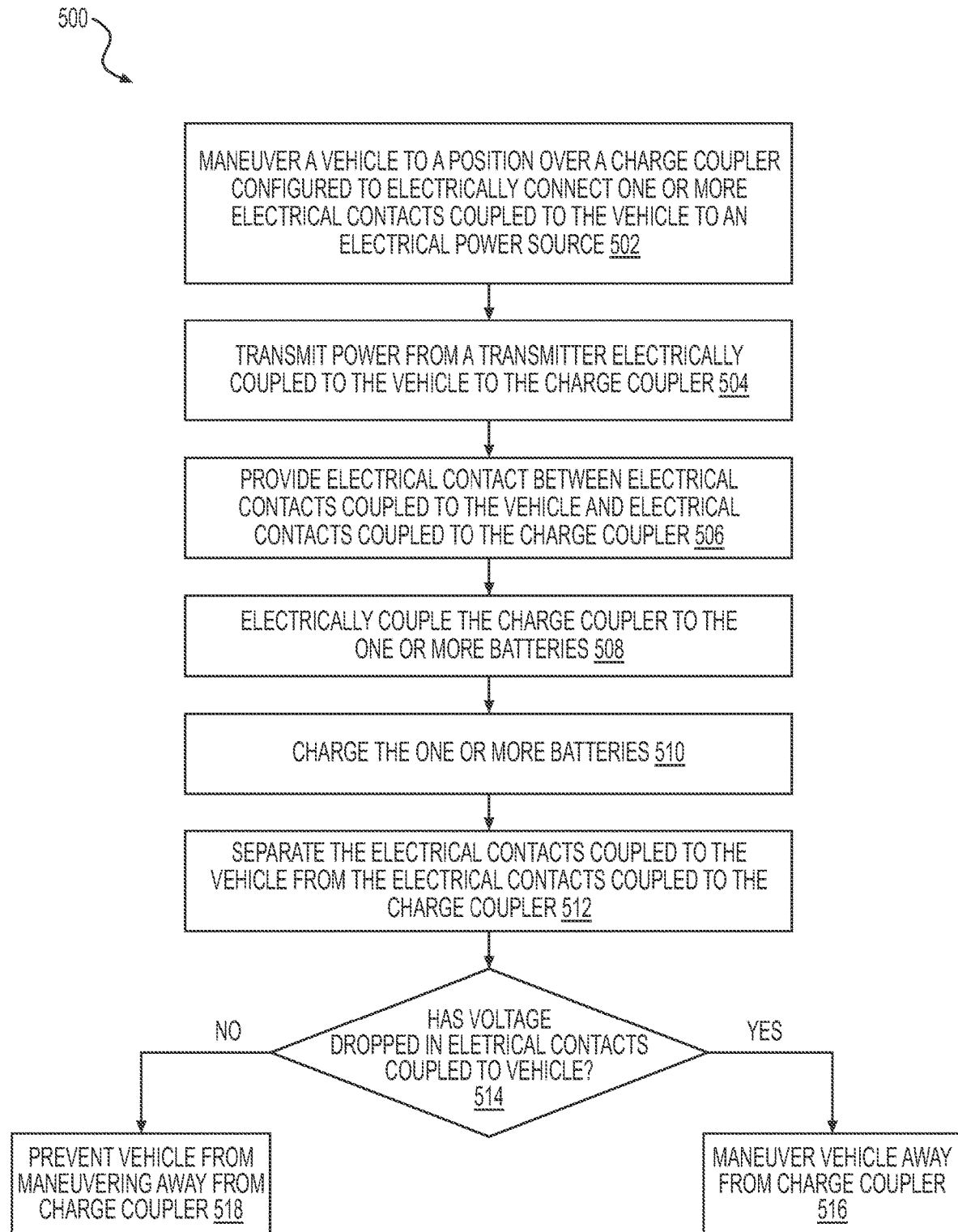
FIG. 5 is a flow diagram of an example process for charging one or more batteries of an example vehicle.
Figure 6:
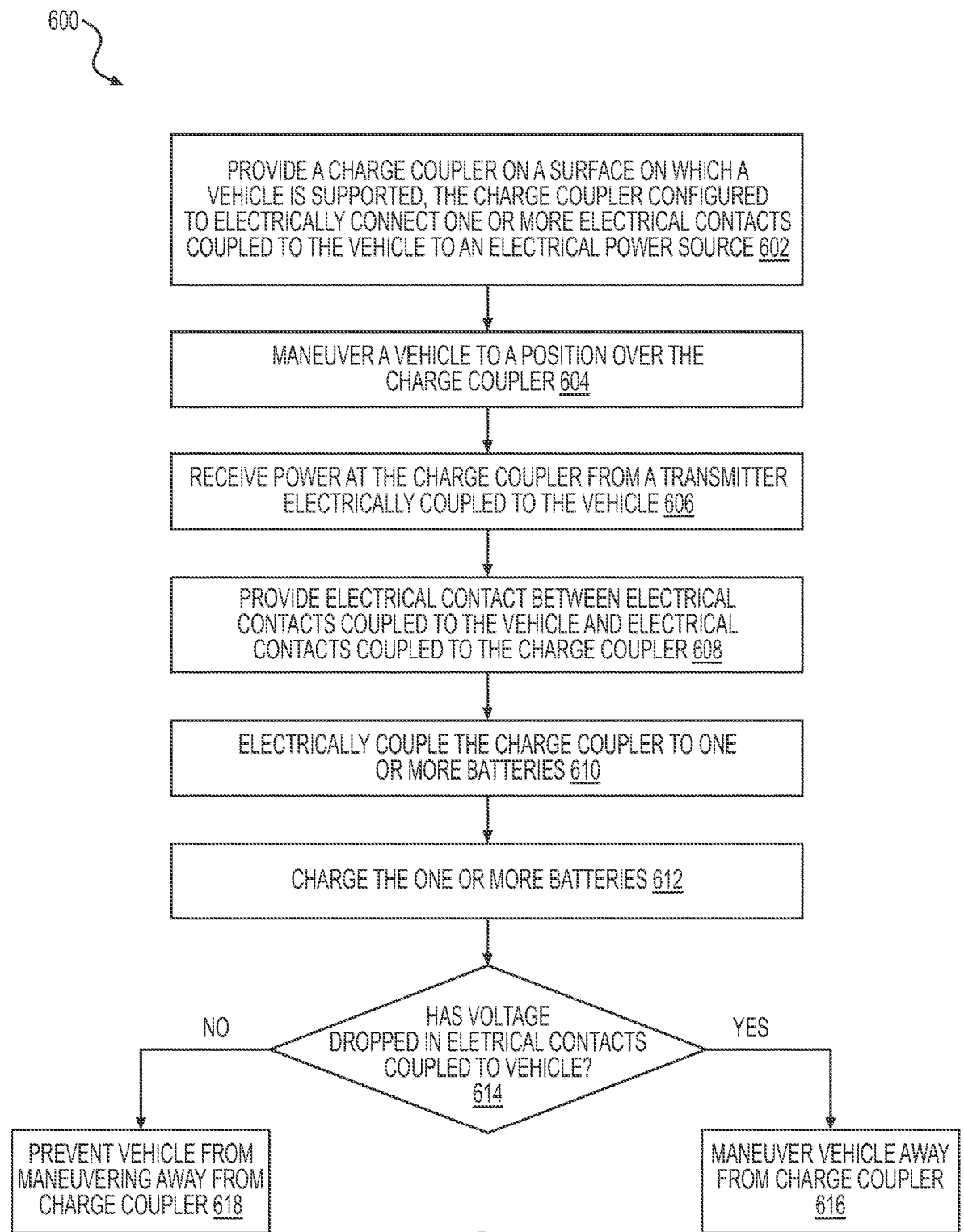
FIG. 6 is a flow diagram of another example process for charging one or more batteries of an example vehicle.

FIGS. 5 and 6 are flow diagrams of an example processes, each illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an example process 500 for charging one or more batteries of a vehicle including one or more electrical propulsion units. At 502, the example process 500 may include maneuvering the vehicle to a position over a charge coupler located on a surface over which the vehicle may maneuver. The charge coupler may be configured to electrically connect one or more electrical contacts coupled to the vehicle to an electrical power source to increase a state of charge of the one or more batteries. In some examples, maneuvering the vehicle may include identifying one or more markers (e.g., QR codes, AR tags, or other fiducials) associated with the charge coupler, generating one or more trajectories based at least in part on identifying the marker, and moving the vehicle according to the one or more trajectories, for example, as described herein. In some examples, maneuvering the vehicle may include receiving one or more signals from a location remote from the vehicle, with the one or more signals providing one or more trajectories (or guidance for determining trajectories) for maneuvering the vehicle into the position over the charge coupler. For example, the vehicle may receive one or more signals from a teleoperations system location remote from the vehicle, a human operator using a remote control device, one or more gestures and/or movements by a human recognizable by a perception module, and the like, as described herein.

In some examples, the process 500 at 504 may include transmitting power from a transmitter electrically coupled to the vehicle to the charge coupler. For example, the charging box may include a transmitter configured to transmit electrical power to a receiver of the charge coupler. In some examples, the transmitter may be an NFC transmitter, the receiver may be an NFC receiver, and the NFC transmitter may transmit electrical power to the NFC receiver. Power received by the receiver may enable control circuitry located within the charge coupler to perform one or more functions and/or send one or more signals. In some examples, once powered on, the charge coupler may relay signals, either via a wired connection or wirelessly, to one or more of an electrical power supply and/or one or more modules of the vehicle. This may result in energizing the electrical contacts of the charge coupler, receiving power from the electrical power supply, and the like.

The example process 500 at 506 may include providing electrical contact between electrical contacts coupled to the vehicle and the electrical contacts coupled to a charge coupler. For example, the electrical contacts of the vehicle may be lowered until they contact the electrical contacts of the charge coupler and/or the electrical contacts of the charge coupler may be raised toward the electrical contacts of the vehicle until they contact the electrical contacts of the vehicle. For example, the vehicle may include active suspension configured to lower the ride height of the vehicle and thereby lower the electrical contacts of the vehicle. In some examples, an actuator associated with the charge coupler may raise the electrical contacts of the charge coupler and thereby contact the electrical contacts of the charge coupler to the electrical contacts of the vehicle. In some examples, the vehicle may include an actuator coupled to the charging box and configured to lower the electrical contacts of the vehicle toward the electrical contacts of the charge coupler. In any of the examples herein, the control signal to lower the suspension and/or raise the charge coupler may originate in the charge controller circuitry.

In some examples, prior to providing electrical contact between the electrical contacts coupled to the vehicle and the electrical contacts coupled to the charge coupler, the electrical contacts of the charge coupler are not energized. For example, as explained herein, the electrical contacts of the charge coupler may not be energized until or unless the receiver in the charge coupler has received a signal from the vehicle (e.g., from the charging box) indicative that the vehicle is positioned over the electrical contacts of the charge coupler, such that the electrical contacts of the charge coupler may be brought into contact with the electrical contacts of the vehicle. Once properly positioned, the electrical contacts of the vehicle and the charge coupler may be brought into contact with one another, and thereafter, the electrical contacts of the charge coupler may be energized. For example, the receiver of the charge coupler may be configured to receive one or more signals from a transmitter of the vehicle (or the charging box), when within range, that induces current to power circuitry in the charge coupler, which permits energizing of the electrical contacts of the charge coupler. This may prevent the electrical contacts of the charge coupler from being energized while exposed, which may improve safety of the system.

In some examples of the process 500, following 506 and before 508, the process 500 may include performing a number of safety-related confirmations and/or lock-outs. For example, the quality of the electrical connection between the electrical contacts may be evaluated by, for example, conducting a voltage check. In some examples, the process 500 may include confirming that the vehicle is in a position relative to the charge coupler suitable for charging, for example, using the wireless communication between the transmitter of the vehicle (e.g., the charging box) and the receiver of the charge coupler. In some examples, the process 500 may also include one or more of preventing the vehicle from maneuvering, preventing the suspension from raising the vehicle separating the electrical contacts of the vehicle from the electrical contacts of the charge coupler, or the like.

At 508, the example process 500 may include electrically coupling the charge coupler to the one or more batteries. In some examples, this may include operating one or more switches in the vehicle (e.g., in the charging box), such that electrical power may be transferred from the electrical contacts of the charge coupler to one or more of the batteries. In some examples, operation of the switches may be controlled by a charge controller configured to control charging of the one or more batteries.

At 510, the example process 500 may include increasing the state of charge of the one or more batteries. For example, the charge controller may be configured to distribute charging between two or more batteries. For example, the charge controller may balance the respective states of charge of each of the two or more batteries. For example, the charge controller may be configured to determine which of the two or more batteries is at a relatively lower state of charge, and charge that battery until its state of charge substantially matches the state of charge of the other battery or batteries. In some examples, thereafter the charge controller may charge the two or more batteries concurrently or substantially simultaneously until they each reach a desired state of charge. As noted herein, the charge controller may be physically incorporated into the charging box, and in some examples, the charge controller may be physically incorporated into the vehicle but remotely from the charging box.

At 512, the example process 500 may include separating the electrical contacts coupled to the vehicle from the electrical contacts coupled to the charge coupler. For example, when the charging is to be terminated, the electrical contacts of the vehicle and the electrical contacts of the charge coupler may be separated from one another. For example, the charging may be terminated when the state of charge and/or the voltages of one or more of the batteries has reached a desired threshold. In some examples, the charging may be terminated for other reasons, such as, for example, the vehicle may need to be moved for certain reasons, and thus, the charging may be terminated prior to moving the vehicle. In some examples, separating the electrical contacts coupled to the vehicle from the electrical contacts coupled to the charge coupler may include reversing the sequence of contacting the electrical contacts to one another described with respect to 506, such as, for example, raising the electrical contacts of the vehicle (e.g., of the charging box) and/or lowering the electrical contacts of the charge coupler, as described herein.

In some examples, the process 500 at 514 may also include determining whether a voltage drop or decay in the electrical contacts coupled to the vehicle has occurred. For example, following separation of the electrical contacts of the vehicle from the electrical contacts of the charge coupler, the charge controller may be configured to receive one or more signals from the electrical contacts of the vehicle (e.g., of the charging box) indicative of the voltage at the contacts. In some examples, if the charge controller receives one or more signals indicative that the voltage of the contacts is dropping, at 516, the process 500 may include communicating one or more signals to the vehicle indicating that the vehicle may maneuver away from the charge coupler. In some examples, the charge controller may communicate such signal(s). In some examples, if the charge controller receives one or more signals indicative that the voltage of the contacts is not dropping, at 518, the process 500 may include communicating one or more signals to the vehicle indicating that the vehicle should remain in position over the charge coupler. In some examples, the charge controller may communicate such signal(s). The one or more signals indicative of the failure of the voltage to drop may be an indication that the contacts of the charge coupler are still receiving electrical power from the electrical power source, and thus, the vehicle may be prevented from maneuvering away from the charge coupler, so that the electrical contacts of the charge coupler are not exposed while energized.

For example, if the electrical contacts of the vehicle are still electrically connected to the electrical power supply, it may be an indication of one or more problems associated with the disconnection from the electrical power source. For example, if a short occurs, the electrical contacts of the vehicle and the electrical contacts of the charge coupler may weld to one another, thereby preventing separation. Under such circumstances, it may be desirable to prevent the vehicle from maneuvering away from (or attempting to maneuver away from) the charge coupler until the electrical contacts can be separated from one another. In some examples, the system (e.g., circuitry in the vehicle (e.g., one or more switches associated with the charge controller) and/or circuitry in the charge coupler (e.g., one or more switches associated with the charge coupler)) may be configured to disconnect the electrical contacts of the vehicle from the one or more batteries and/or disconnect the electrical contacts of the charge coupler and electrical power source.

In some examples, once the electrical contacts coupled to the vehicle and the electrical contacts of the charge coupler have been separated, and the voltage decay has been confirmed, the vehicle may maneuver away from the charge coupler.

FIG. 6 is a flow diagram of another example process 600 for charging one or more batteries of a vehicle including one or more electrical propulsion units. At 602, the example process 600 may include providing a charge coupler on a surface on which a vehicle is supported. In some examples, the charge coupler may include a housing (e.g., housing 114), an electrical connector configured to be coupled to an electrical power source, and one or more electrical contacts coupled to the housing and configured to be electrically coupled to one or more electrical contacts coupled to the vehicle (e.g., contacts incorporated into a charging box coupled to the vehicle). In some examples, the charge coupler may be configured to be portable and used at different locations. For example, the charge coupler may include an anchor configured to selectively secure the housing to the surface. In some examples, the anchor may be configured to facilitate selective securement and removal of the housing from the surface.

In some examples, the process 600 may include, at 604, maneuvering the vehicle to a position over the charge coupler located on a surface over which the vehicle may maneuver. In some examples, the vehicle may be autonomous and maneuver itself, for example, as described herein. For example, as noted herein, maneuvering the vehicle may include identifying one or more markers associated with the charge coupler, generating one or more trajectories based at least in part on identifying the marker, and moving the vehicle according to the one or more trajectories. In some examples, maneuvering the vehicle may include receiving one or more signals from a location remote from the vehicle, with the one or more signals providing one or more trajectories (or guidance for determining trajectories) for maneuvering the vehicle into the position over the charge coupler, for example, as described herein.

The example process 600 may also include at 606 transmitting power from a transmitter electrically coupled to the vehicle to the charge coupler, for example, as described herein.

In some examples, the process 600 may also include at 608 providing electrical contact between electrical contacts coupled to the vehicle and electrical contacts coupled to a charge coupler, for example, as described herein.

At 610, the example process 600 may also include electrically coupling the charge coupler to the one or more batteries, for example, as described herein.

The example process 600 may also include at 612 increasing the state of charge of the one or more batteries, for example, as described herein.

At 614, the example process 600 may also include separating the electrical contacts coupled to the vehicle from the electrical contacts coupled to the charge coupler, for example, as described herein. In some examples, if the charge controller receives one or more signals indicative that the voltage of the contacts is dropping following separation from the charge coupler, at 616, the process 600 may include communicating one or more signals to the vehicle indicating that the vehicle may maneuver away from the charge coupler, for example, as described herein. In some examples, if the charge controller receives one or more signals indicative that the voltage of the contacts is not dropping, at 618, the process 600 may include communicating one or more signals to the vehicle indicating that the vehicle should remain in position over the charge coupler, for example, as described herein.

Figure 7:
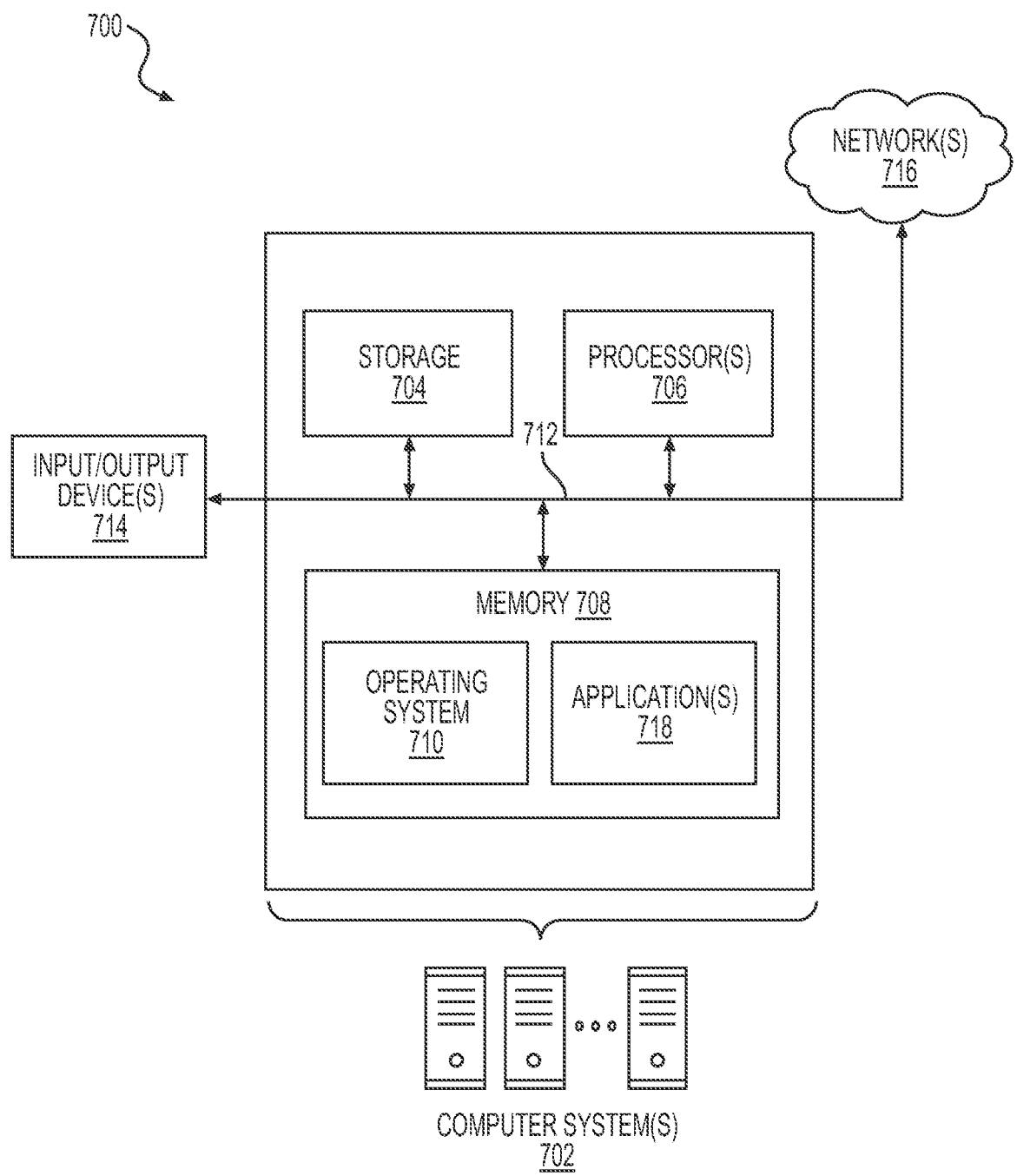
FIG. 7 is a block diagram of an example computer architecture for implementing the processes described herein.

FIG. 7 depicts a block diagram of an example computer architecture 700 for implementing the processes described herein. The example, architecture 700 includes one or more computer systems 702 that may include a storage 704, one or more processor(s) 706, and a memory 708 including an operating system 710. The storage 704, the processor(s) 706, the memory 708, and the operating system 710 may be communicatively coupled over a communication infrastructure 712. In some examples, the computer system(s) 702 may interact with a user, or environment, via input/output (I/O) device(s) 714, as well as one or more other computing devices over one or more networks 716, via the communication infrastructure 712. The operating system 710 may interact with other components to control one or more applications 718 in the memory 708.

In some examples, the computer system(s) 702 may correspond to the computer system(s) 402 of FIG. 4. The computer system(s) 702 may implement any hardware and/or software to implement the modules 404, 406, 408, 410, 412, 414, 416, and 418 to perform the example processes discussed herein.

The systems and methods described herein may be implemented in software or hardware or any combination thereof. The systems and methods described herein may be implemented using one or more computing devices, which may or may not be physically or logically separate from each other. The methods may be performed by components arranged as either on-premise hardware, on-premise virtual systems, or hosted-private instances. Additionally, various aspects of the methods described herein may be combined or merged into other functions.

A processor or computer system may be configured to particularly perform some or all of the methods described herein. In some examples, the methods may be partially- or fully-automated by one or more computers or processors. The systems and methods described herein (or any part(s) or function(s) thereof) may be implemented using hardware, software, firmware, or a combination thereof and may be implemented in one or more computer systems or other processing systems. In some examples, the illustrated system elements may be combined into a single hardware device or separated into multiple hardware devices. If multiple hardware devices are used, the hardware devices may be physically located proximate to or remotely from each other. The examples of the methods described and illustrated are intended to be illustrative and not limiting. For example, some or all of the steps of the methods may be combined, rearranged, and/or omitted in different examples.

In some examples, the systems and methods described herein may be directed to one or more computer systems capable of carrying out the functionality described herein. Example computing devices may be, but are not limited to, a personal computer (PC) system running any operating system, such as, but not limited to, OS X™, iOS™, Linux™ Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device.

The systems described herein may include one or more processors. The processor(s) may be connected to a communication infrastructure, such as, but not limited to, a communications bus, cross-over bar, or network, etc. The processes and processors need not be located at the same physical locations. In other words, processes may be executed at one or more geographically distant processors, over for example, a LAN or WAN connection. Computing devices may include a display interface that may forward graphics, text, and other data from the communication infrastructure for display on a display unit.

The computer system, in some examples, may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some examples, a machine-accessible medium may refer to any storage device used for storing data accessible by a computer. Examples of a machine-accessible medium may include, but are not limited to, a magnetic hard disk; a floppy disk; an optical disk, at least similar to a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices may include, as non-limiting examples, magnetic disks (including internal hard disks and removable disks), magneto-optical disks, optical disks, read-only memory, random access memory, and/or flash storage. Storage devices suitable for tangibly embodying computer program instructions and data may also include all forms of non-volatile memory, including, for example, semiconductor memory devices, such as EPROM, EEPROM, and flash memory devices; magnetic disks, such as internal hard disks and removable disks; magneto-optical disks; and CD-ROM and DVD-ROM discs. The processor and the memory may be supplemented by, or incorporated in, ASICs (application-specific integrated circuits).

The processing system may be in communication with a computerized data storage system. The data storage system may include a non-relational or relational data store, such as a MySQL™ or other relational database. Other physical and logical database types may be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some examples, the processing system may use object-oriented programming and may store data in objects. In such examples, the processing system may use an object-relational mapper (ORM) to store the data objects in a relational database. The systems and methods described herein may be implemented using any number of physical data models. In some examples, a relational database management system (RDBMS) may be used. In such examples, tables in the RDBMS may include columns that represent coordinates. Data may be stored in tables in the RDBMS. The tables may have pre-defined relationships between them. The tables may also have adjuncts associated with the coordinates.

In some examples, secondary memory may include other similar devices for allowing computer programs or other instructions to be loaded into computer systems. Such devices may include, for example, a removable storage unit and an interface. Examples of such may include a program cartridge and cartridge interface (such as, for example, but not limited to, those found in video game devices), a removable memory chip (such as, for example, but not limited to, an erasable programmable read only memory (EPROM), or programmable read only memory (PROM) and associated socket), and other removable storage units and interfaces, which may allow software and data to be transferred from the removable storage unit to the computer system.

The computing system may also include an input device, such as, but not limited to, a voice input device, such as a microphone, touch screens, gesture recognition devices, such as cameras, other natural user interfaces, a mouse or other pointing device, such as a digitizer, and a keyboard or other data entry device. The computer system may also include output devices, such as, but not limited to, a display and a display interface. The computing system may include input/output (I/O) devices, such as, but not limited to, a communications interface, cable and communications path, etc. These devices may include, but are not limited to, a network interface card and modems. Communications interface(s) may allow software and data to be transferred between a computer system and one or more external devices.

In some examples, the computer system may be operatively coupled to an automotive system. Such an automotive system may be either manually operated, semi-autonomous, or fully autonomous. In such examples, input and output devices may include one or more sensors, such as, image capture devices, LIDAR sensors, RADAR sensors, SONAR sensors, and other types of sensors, controllers, microcontrollers, and/or other processors to control automotive functions, such as, but not limited to, acceleration, braking, and steering. Further, communication infrastructure in such examples may also include a Controller Area Network (CAN) bus.

In some examples, the computer system may be operatively coupled to any machine vision-based system. For example, such machine vision-based systems may include, but are not limited to, manually operated, semi-autonomous, or fully autonomous industrial or agricultural robots, household robots, inspection systems, security systems, etc. For example, the examples described herein are not limited to one particular context and may be applicable to any application utilizing machine vision.

Some examples may be practiced in the environment of a computer network or networks. The network may include a private network or a public network (e.g., the Internet), or a combination of both. The network may include hardware, software, or a combination of both.

From a telecommunications-oriented view, the network may be described as a set of hardware nodes interconnected by a communications facility, with one or more processes (hardware, software, or a combination thereof) functioning at each node. The processes may inter-communicate and exchange information with one another via communication pathways between them using interprocess communication pathways. On these pathways, appropriate communications protocols may be used.

An example computer and/or telecommunications network environment may include nodes, which may include hardware, software, or a combination of hardware and software. The nodes may be interconnected via a communications network. Each node may include one or more processes executable by processors incorporated into the nodes. A single process may be run by multiple processors, or multiple processes may be run by a single processor, for example. Additionally, each of the nodes may provide an interface point between the network and the outside world, and may incorporate a collection of sub-networks.

In some examples, the processes may communicate with one another through interprocess communication pathways supporting communication through any communications protocol. The pathways may function in sequence or in parallel, continuously or intermittently. The pathways may use any of the communications standards, protocols or technologies, described herein with respect to a communications network, in addition to standard parallel instruction sets used by many computers.

The nodes may include any entities capable of performing processing functions. Examples of such nodes that may be used with the examples herein may include computers (such as personal computers, workstations, servers, or mainframes), handheld wireless devices and wireline devices (such as personal digital assistants (PDAs), modem cell phones with processing capability, wireless e-mail devices, including but not limited to BlackBerry™ devices), document processing devices (such as scanners, printers, facsimile machines, or multifunction document machines), or complex entities (such as local-area networks or wide-area networks), to which are connected a collection of processors, as described. For example, a node itself may be a wide-area network (WAN), a local-area network (LAN), a private network (such as a Virtual Private Network (VPN)), or a collection of networks.

Communications between the nodes may be made possible by a communications network. A node may be connected either continuously or intermittently with the communications network. As an example, a communications network may be a digital communications infrastructure providing adequate bandwidth and information security.

The communications network may include wireline communications capability, wireless communications capability, or a combination of both, at any frequencies, using any type of standard, protocol, or technology. In addition, in some examples, the communications network may be a private network (e.g., a VPN) or a public network (e.g., the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example, non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP), and user datagram protocol (UDP). Any other known or anticipated wireless or wireline protocols and technologies may be used.

Examples disclosed herein may include apparatuses for performing the operations described herein. An apparatus may be specially constructed for the desired purposes, or it may include a general-purpose device selectively activated or reconfigured by a program stored in the device.

Some examples may be embodied in machine-executable instructions. The instructions may be used to cause a processing device, for example, a general-purpose or special-purpose processor, which is programmed with instructions to perform the steps of the processes described herein. Alternatively, the steps of the described herein may be performed by specific hardware components that contain hardwired logic for performing the steps, or by any combination of programmed computer components and custom hardware components. For example, the systems and processes described herein may be provided as a computer program product, as outlined above. Some examples may include a machine-readable medium having instructions stored thereon. The instructions may be used to program any processor or processors (or other electronic devices) to perform a process or method according to the examples described herein. In addition, some examples may be downloaded and stored on a computer program product. In such examples, the program may be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The processes may be implemented in a computer program product accessible from a computer-usable or computer-readable storage medium that provides program code for use by, or in connection with, a computer or any instruction execution system. A computer-usable or computer-readable storage medium may be any apparatus that is capable of containing or storing the program for use by, or in connection with, the computer or instruction execution system, apparatus, or device.

A data processing system suitable for storing and/or executing the corresponding program code may include at least one processor coupled directly or indirectly to computerized data storage devices, such as memory elements. Input/output (I/O) devices, including, but not limited to, keyboards, displays, pointing devices, etc., may be coupled to the system. Network adapters may also be coupled to the system to enable the data processing system to become coupled to other data processing systems or remote printers or storage devices through intervening private or public networks. To provide for interaction with a user, the features may be implemented on a computer with a display device, such as an LCD (liquid crystal display) or another type of monitor for displaying information to the user, and a keyboard and an input device, such as a mouse or trackball, by which the user may provide input to the computer.

A computer program may be a set of instructions that may be used, directly or indirectly, in a computer. The systems and methods described herein may be implemented using programming languages, such as, for example, CUDA, OpenCL, Flash™, JAVA™ C++, C, C#, Python, Visual Basic™, JavaScript™ PHP, XML, HTML, etc., or a combination of programming languages, including compiled or interpreted languages, and may be deployed in any form, including as a stand-alone program or as a module, component, subroutine, or other unit suitable for use in a computing environment. The software may include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™ iOS™, Unix™/X-Windows™, Linux™, etc. The system may be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device, such as a read-only memory, a random-access memory, both, or any combination of the data storage devices described herein. A processor may include any processing circuitry or control circuitry operative to control the operations and performance of an electronic device.

The systems, modules, and methods described herein may be implemented using any combination of software or hardware elements. The systems, modules, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example system for charging one or more batteries of a vehicle, the system comprising:
one or more electrically conductive contacts configured to be accessible from under the vehicle, the one or more electrically conductive contacts configured to be electrically connected to the one or more batteries to charge one or more of the batteries, the one or more electrically conductive contacts comprising a positive electrical contact and a negative electrical contact;
a suspension system configured to be coupled to the vehicle and lower the electrically conductive contacts; and
one or more switches configured to electrically couple the positive electrical contact and the negative electrical contact to the one or more batteries.

B. The system of example A, further comprising a transmitter configured to transmit a wireless power transmission.

C. The system of example A or example B, wherein:
the transmitter comprises an inductive electrical coupling; and
the one or more switches are actuated based at least in part on a signal received in response to the wireless power transmission, the signal configured at the charge coupler within a threshold distance of the system.

D. The system of any one of example A through example C, wherein the system further comprises a charge controller configured to distribute charging between two or more batteries of the vehicle, and wherein the charge controller is configured to balance states of charge of the two or more batteries.

E. The system of any one of example A through example D, wherein the one or more switches are actuated, based at least in part, on a signal indicative of one or more of information received from a charge controller, a voltage difference or an impedance between the one or more contacts, or temperature.

F. An example method for charging one or more batteries of a vehicle, the method comprising:
maneuvering the vehicle to a position over a charge coupler configured to electrically connect one or more electrical contacts of the vehicle to an electrical power source to charge the one or more batteries;
lowering the one or more electrical contacts of the vehicle toward the charge coupler;
providing electrical connection between the electrical contacts of the vehicle and electrical contacts of a charge coupler to charge the one or more batteries;
electrically coupling the electrical contacts of the vehicle to the one or more batteries by actuating one or more switches; and
receiving electrical power from the electrical power source via the charge coupler to charge the one or more batteries.

G. The method of example F, further comprising:
transmitting power via an inductive coupling to the charge coupler; and
receive one or more signals from the charge coupler.

H. The method of example F or example G, wherein the one or more electrical contacts of the vehicle are configured to be accessible from under the vehicle and are sized to be larger than the electrical contacts of the charge coupler in at least one dimension.

I. The method of any one of example F through example H, wherein maneuvering the vehicle comprises generating one or more trajectories using a perception system associated with the vehicle and maneuvering the vehicle according to the one or more trajectories.

J. The method of any one of example F through example I, wherein maneuvering the vehicle comprises:

identifying one or more markers associated with the charge coupler;

generating one or more trajectories based at least in part on identifying the marker; and maneuvering the vehicle according to the one or more trajectories, and wherein the one or more markers comprise one or more of a physical marker, a QR code, an AR tag, an RFID tag, or Wi-Fi simultaneous localization and mapping (SLAM).

K. The method of any one of example F through example J, wherein maneuvering the vehicle comprises receiving one or more signals from a location remote from the vehicle, the one or more signals providing one or more trajectories for maneuvering the vehicle into the position over the charge coupler.

L. The method of any one of example F through example K, wherein providing electrical connection between the electrical contacts of the vehicle and the electrical contacts of the charge coupler comprises at least one of lowering the vehicle or transmitting a signal to raise the charge coupler.

M. The method of any one of example F through example L, wherein the vehicle comprises active suspension, and lowering the one or more electrical contacts of the vehicle toward the charge coupler comprises lowering the vehicle via the active suspension.

N. The method of any one of example F through example M, wherein:

lowering the vehicle is based, at least in part, on receiving a signal from the charge coupler; and the one or more switches are actuated based at least in part on one or more of an impedance, voltage, or temperature measured across the electrical contacts of the vehicle to electrically couple the one or batteries of the vehicle with the electrical contacts of the vehicle.

O. The method of any one of example F through example N, wherein the one or more signals received from the charge coupler comprises one or more of:

a signal indicating that the charge coupler is electrically energized; or a signal indicating that the vehicle is located within a threshold distance of the charge coupler.

P. The method of any one of example F through example O, wherein the one or more batteries comprises two or more batteries, and wherein charging the two or more batteries comprises:

monitoring one or more of a voltage of a state of charge of the two or more batteries; and electrically coupling one of the two or more batteries to the electrical contacts of the vehicle based, at least in part, on the one or more of the voltage of state of charge.

Q. The method of any one of example F through example P, further comprising:

raising the vehicle to disconnect the electrical contacts coupled to the vehicle from the electrical contacts coupled to the charge coupler;

confirming a voltage decay in the electrical contacts coupled to the vehicle; and maneuvering the vehicle away from the charge coupler based, at least in part, on the voltage decay.

R. An example vehicle comprising:

a chassis;

one or more batteries;

one or more suspension systems coupled to the chassis and one or more wheels of the vehicle, the one or more suspension systems configured to alter a distance between the chassis and a surface supporting the vehicle; and one or more electrical contacts configured to provide electrical communication between the one or more batteries of the vehicle and a charge coupler configured to electrically connect the one or more electrical contacts to an electrical power source to charge the one or more batteries, the one or more electrical contacts having a substantially planar contact surface, wherein the one or more electrical contacts are positioned to facilitate contact with the charge coupler from under the vehicle.

S. The vehicle of example R, further comprising a transmitter configured to activate the charge coupler.

T. The vehicle of example R or example S, wherein the vehicle comprises one or more switches to electrically couple the one or more electrical contacts of the vehicle with the one or more batteries, the one or more switches actuated based, at least in part, on one or more of a voltage of the one or more batteries, a state of charge or the one or more batteries, or a signal received from the charge coupler.

U. An example charge coupler comprising:

an electrical connector configured to be coupled to an electrical power source;

one or more electrical contacts configured to be electrically coupled to one or more electrical contacts of a vehicle from under the vehicle; and a receiver configured to receive a signal from the vehicle for activating the charge coupler and electrically connecting the electrical power source to the one or more electrical contacts of the vehicle.

V. The charge coupler of example U, wherein:

the receiver comprises an inductive coupling configured to receive, wirelessly, an amount of electrical power; and the signal comprises a power transmission.

W. The charge coupler of example U or example V, wherein the electrical connector is configured to receive pins of a pin-type connector of the electrical power source.

X. The charge coupler of any one of example U through example W, further comprising an actuator configured to move the electrical contacts of the charge coupler along a direction of the one or more electrical contacts of the vehicle.

Y. The charge coupler of any one of example U through example X, further comprising an electrical connector configured to transmit one or more of data or electrical power between the charge coupler and the electrical power source.

Z. The charge coupler of any one of example U through example Y, wherein:

the receiver comprises an inductive coupling;

the signal comprises a wireless power transmission; and activating the charge coupler comprises:

determining a power associated with the wireless power transmission meets or exceeds a threshold power; and transmitting one or more data signals from the charge coupler.

AA. The charge coupler of any one of example U through example Z, wherein at least one of the one or more data signals is configured to cause the electrical power source to transmit electrical power.

BB. An example method for charging one or more batteries of a vehicle, the method comprising:

providing a charge coupler on a surface on which the vehicle is supported, the charge coupler comprising:

an electrical connector configured to be coupled to an electrical power source; and one or more electrical contacts configured to be electrically coupled to one or more electrical contacts of the vehicle;

detecting, via a wireless power transmission, that the one or more electrical contacts of the charge coupler and the one or more electrical contacts of the vehicle are within a threshold distance of each other; and electrically connecting the charge coupler to the one or more electrical contacts of the vehicle; and transmitting power to the vehicle from the electrical power source to the vehicle via the one or more electrical contacts of the charge coupler.

CC. The method of example BB, further comprising:

receiving at the charge coupler via an inductive coupling a power signal, the power signal comprising wirelessly transmitted power;

powering a circuit on the charge coupler based, at least in part, on the power signal;

generating, with the circuit, a control signal based, at least in part, on receiving the power signal;

transmitting the control signal to one or more of the vehicle or the electrical power source.

DD. The method of example BB or example CC, wherein detecting the one or more electrical contacts of the charge coupler and the one or more electrical contacts of the vehicle are within a threshold distance of each other comprises determining an amount of power of the power signal.

EE. The method of any one of example BB through example DD, wherein causing contact between the one or more electrical contacts of the charge coupler and the one or more electrical contacts of the vehicle comprises raising the charge coupler.

FF. The method of any one of example BB through example EE, wherein the electrical contacts of the vehicle and the electrical contacts of the charge coupler are enclosed in a physical barrier comprising a resilient member.

GG. The method of any one of example BB through example FF, wherein the charge coupler is electrically coupled to the electrical power source based, at least in part, on detecting the one or more electrical contacts of the charge coupler and the one or more electrical contacts of the vehicle are within a threshold distance of each other.

HH. The method of any one of example BB through example GG, further comprising separating the one or more electrical contacts of the vehicle from the one or more electrical contacts of the charge coupler by lowering the charge coupler.

II. An example charge coupler comprising:

an electrical connector configured to be coupled to an electrical power source;

one or more electrical contacts configured to be electrically coupled to one or more electrical contacts of a vehicle from under the vehicle when the vehicle is within a threshold distance of the charge coupler; and a receiver configured to receive a signal for activating the charge coupler and electrically connect the electrical power source to the one or more electrical contacts of the vehicle.

JJ. The charge coupler of example II, wherein:

the receiver comprises an inductive coupling;

the signal is a wireless power transmission, and activating the charge coupler comprises:

determining a power associated with the wireless power transmission meets or exceeds a threshold power; and transmitting one or more data signals from the charge coupler.

KK. The charge coupler of example II or example JJ, further comprising an actuator configured move the housing toward the one or more electrical contacts of the vehicle based, at least in part, on the vehicle being within the threshold distance of the charge coupler.

LL. The charge coupler of any one or example II through example KK, further comprising an electrical connector configured to transmit one or more of data or electrical power between the charge coupler and the electrical power source.

MM. The charge coupler of any one or example II through example LL, further comprising a power cable coupled to the electrical connector and configured to be coupled to the electrical power source, the power cable comprising a ground cable, wherein at least one of the one or more data signals is configured to cause the electrical power source to transmit electric power.

NN. The charge coupler of any one or example II through example MM, wherein at least one of the one or more data signals comprises information that the vehicle is within the threshold distance of the charge coupler, the at least one signal being transmitted to the vehicle.

What is claimed is:

1. A system for charging one or more batteries of a vehicle, the system comprising:

a case coupled to a chassis of the vehicle;

one or more electrically conductive contacts coupled to the case and configured to be accessible from under the vehicle, the one or more electrically conductive contacts configured to be electrically connected to the one or more batteries to charge one or more of the batteries, the one or more electrically conductive contacts comprising a positive electrical contact and a negative electrical contact;

an active suspension system configured to couple at least one wheel to the vehicle and to lower the chassis and, the case, and the electrically conductive contacts toward a surface supporting the vehicle; and one or more switches configured to electrically couple the positive electrical contact and the negative electrical contact to the one or more batteries, wherein the case is immovably attached to the chassis, such that lowering the chassis by the active suspension lowers the case and causes the one or more electrically conductive contacts to physically contact with a charge coupler under the vehicle.

2. The system of claim 1, further comprising a transmitter configured to transmit a wireless power transmission.

3. The system of claim 2, wherein:

the transmitter comprises an inductive electrical coupling; and the one or more switches are actuated based at least in part on a signal received in response to the wireless power transmission, the signal configured at the charge coupler within a threshold distance of the system.

4. The system of claim 1, wherein the system further comprises a charge controller configured to distribute charging between two or more batteries of the vehicle, and wherein the charge controller is configured to balance states of charge of the two or more batteries.

5. The system of claim 1, wherein the one or more switches are actuated, based at least in part, on a signal indicative of one or more of information received from a charge controller, a voltage difference or an impedance between the one or more contacts, or temperature.

6. A method for charging one or more batteries of a vehicle, the method comprising:

maneuvering the vehicle to a position over a charge coupler configured to electrically connect one or more electrical contacts of the vehicle to an electrical power source to charge the one or more batteries;

lowering, by an active suspension, a chassis of the vehicle, a case coupled to the chassis, and the one or more electrical contacts of the vehicle coupled to the case toward the charge coupler, wherein the case is immovably attached to the chassis, such that lowering the chassis lowers the case and causes the one or more electrical contacts to physically contact with a charge coupler;

providing electrical connection between the electrical contacts of the vehicle and electrical contacts of the charge coupler to charge the one or more batteries;

electrically coupling the electrical contacts of the vehicle to the one or more batteries by actuating one or more switches; and receiving electrical power from the electrical power source via the charge coupler to charge the one or more batteries.

7. The method of claim 6, further comprising:
transmitting power via an inductive coupling to the charge coupler; and
receiving one or more signals from the charge coupler.

8. The method of claim 6, wherein the one or more electrical contacts of the vehicle are configured to be accessible from under the vehicle and are sized to be larger than the electrical contacts of the charge coupler in at least one dimension.

9. The method of claim 6, wherein maneuvering the vehicle comprises generating one or more trajectories using a perception system associated with the vehicle and maneuvering the vehicle according to the one or more trajectories.

10. The method of claim 6, wherein maneuvering the vehicle comprises:
identifying one or more markers associated with the charge coupler;
generating one or more trajectories based at least in part on identifying the marker; and
maneuvering the vehicle according to the one or more trajectories, and
wherein the one or more markers comprise one or more of a physical marker, a QR code, an AR tag, an RFID tag.

11. The method of claim 6, wherein maneuvering the vehicle comprises receiving one or more signals from a location remote from the vehicle, the one or more signals providing one or more trajectories for maneuvering the vehicle into the position over the charge coupler.

12. The method of claim 6, wherein providing electrical connection between the electrical contacts of the vehicle and the electrical contacts of the charge coupler further comprises transmitting a signal to raise the charge coupler.

13. The method of claim 6, wherein:
lowering the vehicle is based, at least in part, on receiving a signal from the charge coupler; and
the one or more switches are actuated based at least in part on one or more of an impedance, voltage, or temperature measured across the electrical contacts of the vehicle to electrically couple the one or batteries of the vehicle with the electrical contacts of the vehicle.

14. The method of claim 7, wherein the one or more signals received from the charge coupler comprises one or more of:

a signal indicating that the charge coupler is electrically energized; or
a signal indicating that the vehicle is located within a threshold distance of the charge coupler.

15. The method of claim 6, wherein the one or more batteries comprises two or more batteries, and wherein charging the two or more batteries comprises:
monitoring one or more of a voltage or a state of charge of the two or more batteries; and
electrically coupling one of the two or more batteries to the electrical contacts of the vehicle based, at least in part, on the one or more of the voltage or state of charge.

16. The method of claim 13, further comprising:
raising the vehicle to disconnect the electrical contacts coupled to the vehicle from the electrical contacts coupled to the charge coupler;
confirming a voltage decay in the electrical contacts coupled to the vehicle; and
maneuvering the vehicle away from the charge coupler based, at least in part, on the voltage decay.

17. A vehicle comprising:
a chassis;
a case coupled to the chassis
one or more batteries;
one or more active suspension systems coupled to the chassis and one or more wheels of the vehicle, the one or more active suspension systems configured to control a distance between the chassis and a surface supporting the vehicle; and
one or more electrical contacts coupled to the case and configured to provide electrical communication between the one or more batteries of the vehicle and a charge coupler configured to electrically connect the one or more electrical contacts to an electrical power source to charge the one or more batteries, the one or more electrical contacts having a substantially planar contact surface,
wherein the one or more electrical contacts are positioned to facilitate contact with the charge coupler from under the vehicle, and
wherein the case is immovably attached to the chassis, such that controlling the distance between the chassis and the surface supporting the vehicle brings the electrical contacts into physical contact with the charge coupler.

18. The vehicle of claim 17, further comprising a transmitter configured to activate the charge coupler.

19. The vehicle of claim 17, wherein the vehicle comprises one or more switches to electrically couple the one or more electrical contacts of the vehicle with the one or more batteries, the one or more switches actuated based, at least in part, on one or more of a voltage of the one or more batteries, a state of charge or the one or more batteries, or a signal received from the charge coupler.

20. The vehicle of claim 17, wherein the electrical contacts are substantially planar and are aligned linearly along at least one of a longitudinal axis or a latitudinal axis of the vehicle.

* * * * *